US012560765B2

(12) United States Patent
Rosson

(10) Patent No.: US 12,560,765 B2
(45) Date of Patent: Feb. 24, 2026

(54) POLARITY CHANGEABLE OPTICAL CONNECTOR

(71) Applicant: CORNING RESEARCH & DEVELOPMENT CORPORATION, Corning, NY (US)

(72) Inventor: Joel Christopher Rosson, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 327 days.

(21) Appl. No.: 18/111,927

(22) Filed: Feb. 21, 2023

(65) Prior Publication Data

US 2023/0280541 A1 Sep. 7, 2023

Related U.S. Application Data

(60) Provisional application No. 63/315,642, filed on Mar. 2, 2022.

(51) Int. Cl.
*G02B 6/38* (2006.01)

(52) U.S. Cl.
CPC ......... *G02B 6/3825* (2013.01); *G02B 6/3812* (2013.01); *G02B 6/3879* (2013.01)

(58) Field of Classification Search
None
See application file for complete search history.

(56) References Cited

U.S. PATENT DOCUMENTS

| | | | |
|---|---|---|---|
| 5,579,425 A | 11/1996 | Lampert et al. | |
| 6,565,262 B2 | 5/2003 | Childers et al. | |
| 7,150,567 B1 | 12/2006 | Luther et al. | |
| 7,641,398 B2 | 1/2010 | O'Riorden et al. | |
| 7,712,970 B1 | 5/2010 | Lee | |
| 8,152,384 B2 | 4/2012 | De Jong et al. | |
| 8,152,385 B2 | 4/2012 | De Jong et al. | |
| 8,221,007 B2 | 7/2012 | Peterhans et al. | |
| 8,376,629 B2 | 2/2013 | Cline et al. | |
| 8,662,760 B2 | 3/2014 | Cline et al. | |
| 8,678,669 B2 | 3/2014 | Lee | |
| 8,696,215 B1 | 4/2014 | Fewkes et al. | |
| 8,702,322 B1 | 4/2014 | Danley et al. | |
| 8,727,638 B2 | 5/2014 | Lee et al. | |
| 8,764,308 B2 | 7/2014 | Irwin et al. | |

(Continued)

FOREIGN PATENT DOCUMENTS

| | | |
|---|---|---|
| CN | 203720408 U | 7/2014 |
| CN | 203786336 U | 8/2014 |

(Continued)

OTHER PUBLICATIONS

European Patent Application No. 23159232.0, Partial European Search Report, dated Jul. 10, 2023; 11 pages; European Patent Office.

(Continued)

*Primary Examiner* — Jerry Rahll
(74) *Attorney, Agent, or Firm* — Kapil U. Banakar

(57) ABSTRACT

The present disclosure relates to a connector assembly and a corresponding method to reverse polarity of the connector. The method enables polarity reversal without bending/twisting optical fibers within the connector assembly.

20 Claims, 41 Drawing Sheets

(56) References Cited

U.S. PATENT DOCUMENTS

| | | | |
|---|---|---|---|
| 9,063,303 | B2 | 6/2015 | Irwin et al. |
| 9,207,410 | B2 | 12/2015 | Lee et al. |
| 9,407,073 | B2 | 8/2016 | Elenbaas |
| 9,448,370 | B2 | 9/2016 | Xue et al. |
| 9,465,172 | B2 | 10/2016 | Shih |
| 9,557,495 | B2 | 1/2017 | Raven et al. |
| 9,557,496 | B2 | 1/2017 | Irwin et al. |
| 9,568,686 | B2 | 2/2017 | Fewkes et al. |
| 9,595,786 | B1 | 3/2017 | Takano et al. |
| 9,599,778 | B2 | 3/2017 | Wong et al. |
| 9,678,283 | B1 | 6/2017 | Chang et al. |
| 9,678,285 | B2 | 6/2017 | Hill et al. |
| 9,684,130 | B2 | 6/2017 | Veatch et al. |
| 9,791,637 | B2 | 10/2017 | Danley et al. |
| 9,829,650 | B2 | 11/2017 | Irwin et al. |
| 9,869,825 | B2 | 1/2018 | Bailey et al. |
| 9,927,582 | B2 | 3/2018 | Chang et al. |
| 9,933,584 | B2 | 4/2018 | Lin |
| 9,941,631 | B1 | 4/2018 | Taira et al. |
| 9,946,035 | B2 | 4/2018 | Gustafson et al. |
| 9,958,621 | B2 | 5/2018 | Wong et al. |
| 9,971,102 | B2 | 5/2018 | Raven et al. |
| 10,007,068 | B2 | 6/2018 | Hill et al. |
| 10,042,129 | B2 | 8/2018 | Taira et al. |
| 10,067,301 | B2 | 9/2018 | Murray et al. |
| 10,078,186 | B1 | 9/2018 | Hsu et al. |
| 10,114,180 | B2 | 10/2018 | Suzic |
| 10,120,138 | B2 | 11/2018 | Jones |
| 10,139,572 | B2 | 11/2018 | Hopper et al. |
| 10,158,194 | B2 | 12/2018 | Takano et al. |
| 10,162,129 | B2 | 12/2018 | Smith et al. |
| 10,191,230 | B2 | 1/2019 | Wong et al. |
| 10,228,521 | B2 | 3/2019 | Gniadek et al. |
| 10,281,668 | B2 | 5/2019 | Takano et al. |
| 10,281,669 | B2 | 5/2019 | Takano et al. |
| 10,288,819 | B2 | 5/2019 | Chang et al. |
| 10,359,582 | B2 | 7/2019 | He |
| 10,444,441 | B1 | 10/2019 | Ho et al. |
| 10,495,824 | B2 | 12/2019 | Rosson |
| 10,520,687 | B2 | 12/2019 | Lee |
| 10,520,688 | B2 | 12/2019 | Ma et al. |
| 10,520,689 | B2 | 12/2019 | Gniadek et al. |
| 10,520,690 | B2 | 12/2019 | Takano et al. |
| 10,527,802 | B2 | 1/2020 | Wong et al. |
| 10,545,296 | B2 | 1/2020 | Murray et al. |
| 10,585,247 | B2 | 3/2020 | Takano et al. |
| 10,634,854 | B2 | 4/2020 | Davidson et al. |
| 10,712,512 | B2 | 7/2020 | Ho et al. |
| 10,739,533 | B2 | 8/2020 | Gniadek et al. |
| 10,768,381 | B2 | 9/2020 | Li |
| 10,928,594 | B2 | 2/2021 | Iizumi et al. |
| 10,983,286 | B2 | 4/2021 | Takano et al. |
| 11,002,923 | B2 | 5/2021 | Ho et al. |
| 11,112,565 | B2 | 9/2021 | Chang et al. |
| 11,131,814 | B2 | 9/2021 | Iizumi et al. |
| 11,152,748 | B2 | 10/2021 | Takano et al. |
| 11,454,767 | B2 * | 9/2022 | Ho ........................ G02B 6/3825 |
| 11,934,017 | B2 * | 3/2024 | Rosson ................ G02B 6/3831 |
| 2008/0226237 | A1 | 9/2008 | O'Riorden et al. |
| 2011/0299814 | A1 | 12/2011 | Nakagawa |
| 2012/0155810 | A1 | 6/2012 | Nakagawa |
| 2015/0212282 | A1 | 7/2015 | Lin |
| 2016/0047993 | A1 | 2/2016 | Hioki et al. |
| 2016/0327756 | A1 | 11/2016 | Raven et al. |
| 2017/0205590 | A1 | 7/2017 | Bailey et al. |
| 2017/0285268 | A1 | 10/2017 | Veatch et al. |
| 2018/0314014 | A1 | 11/2018 | Irwin et al. |
| 2019/0170949 | A1 * | 6/2019 | Collier ..................... G02B 6/02 |
| 2019/0187387 | A1 | 6/2019 | Wong et al. |
| 2019/0339475 | A1 | 11/2019 | Takano et al. |
| 2019/0346633 | A1 | 11/2019 | Cloud et al. |
| 2019/0391343 | A1 | 12/2019 | Aoshima et al. |
| 2020/0003963 | A1 | 1/2020 | Iizumi et al. |
| 2020/0081195 | A1 | 3/2020 | Ho et al. |
| 2020/0103601 | A1 | 4/2020 | Rosson |
| 2020/0116955 | A1 | 4/2020 | Ho et al. |
| 2020/0371299 | A1 | 11/2020 | Gniadek et al. |
| 2020/0393630 | A1 | 12/2020 | Wong et al. |
| 2021/0141162 | A1 | 5/2021 | Ma et al. |
| 2021/0149125 | A1 | 5/2021 | Taira et al. |
| 2021/0165169 | A1 | 6/2021 | Takano et al. |
| 2021/0255400 | A1 | 8/2021 | Inaba et al. |
| 2021/0263239 | A1 | 8/2021 | Lin |
| 2021/0263242 | A1 | 8/2021 | Lin |
| 2021/0281005 | A1 | 9/2021 | Taira et al. |
| 2021/0286134 | A1 | 9/2021 | Taira et al. |
| 2021/0302665 | A1 | 9/2021 | Gandla et al. |
| 2021/0302666 | A1 | 9/2021 | Gandla et al. |
| 2021/0364704 | A1 | 11/2021 | Inaba et al. |
| 2023/0280541 | A1 * | 9/2023 | Rosson ................ G02B 6/3825 385/77 |
| 2024/0069290 | A1 * | 2/2024 | McKinney ........... G02B 6/3879 |

FOREIGN PATENT DOCUMENTS

| | | |
|---|---|---|
| CN | 203965665 U | 11/2014 |
| CN | 106383383 A | 2/2017 |
| CN | 206696473 U | 12/2017 |
| CN | 207965232 U | 10/2018 |
| CN | 209281010 U | 8/2019 |
| CN | 209858786 U | 12/2019 |
| CN | 210835337 U | 6/2020 |
| CN | 211905777 U | 11/2020 |
| CN | 213876106 U | 8/2021 |
| CN | 213876107 U | 8/2021 |
| CN | 213876108 U | 8/2021 |
| CN | 214225494 U | 9/2021 |
| CN | 214225495 U | 9/2021 |
| CN | 214225496 U | 9/2021 |
| CN | 214225497 U | 9/2021 |
| CN | 214225498 U | 9/2021 |
| CN | 214225499 U | 9/2021 |
| CN | 214225500 U | 9/2021 |
| EP | 2906978 A2 | 8/2015 |
| GB | 2468188 B | 5/2011 |
| GB | 2538089 A | 11/2016 |
| IN | 111399134 A | 7/2020 |
| JP | 2018-518718 A | 7/2018 |
| WO | 2014/057264 A2 | 4/2014 |
| WO | 2016/082160 A1 | 6/2016 |
| WO | 2019/126333 A1 | 6/2019 |
| WO | 2020/013059 A1 | 1/2020 |
| WO | 2020/021966 A1 | 1/2020 |
| WO | 2020/056002 A1 | 3/2020 |

OTHER PUBLICATIONS

"ASCEND™ Patch Cord Assemblies", In Optical Connectivity, pp. 2-00284, Revision 2, AFL Global, Apr. 24, 2019, 1 page.

"EZ-FLIP LC polarity Reversible Connector, Senko Group", 1 page.

"Fiber Optic Connector Intermateability Standard—Type LC", TIA/EIA Standard, Mar. 6, 2002, 38 pages.

"Fiber Optic LC portfolio", Edition Jul. 2017, Huber+Suhner , 2017, 24 pages.

MDC Connector, Retrieved from: http://www.usconec.com/mdc_connector, 14 pages.

SENKO Advanced Components, Retrieved from: https://www.senko.com/sn-connector/, 6 pages.

* cited by examiner

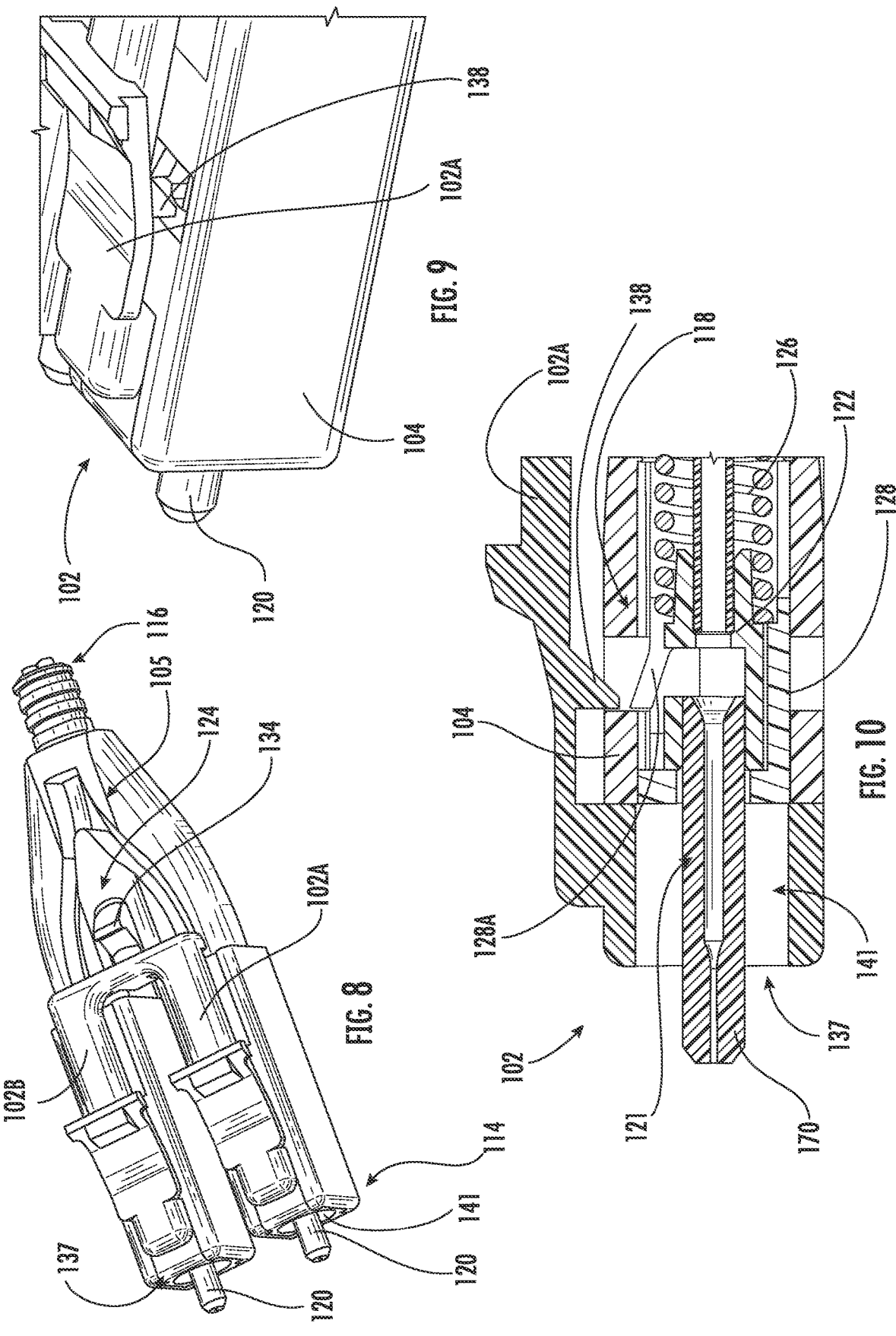

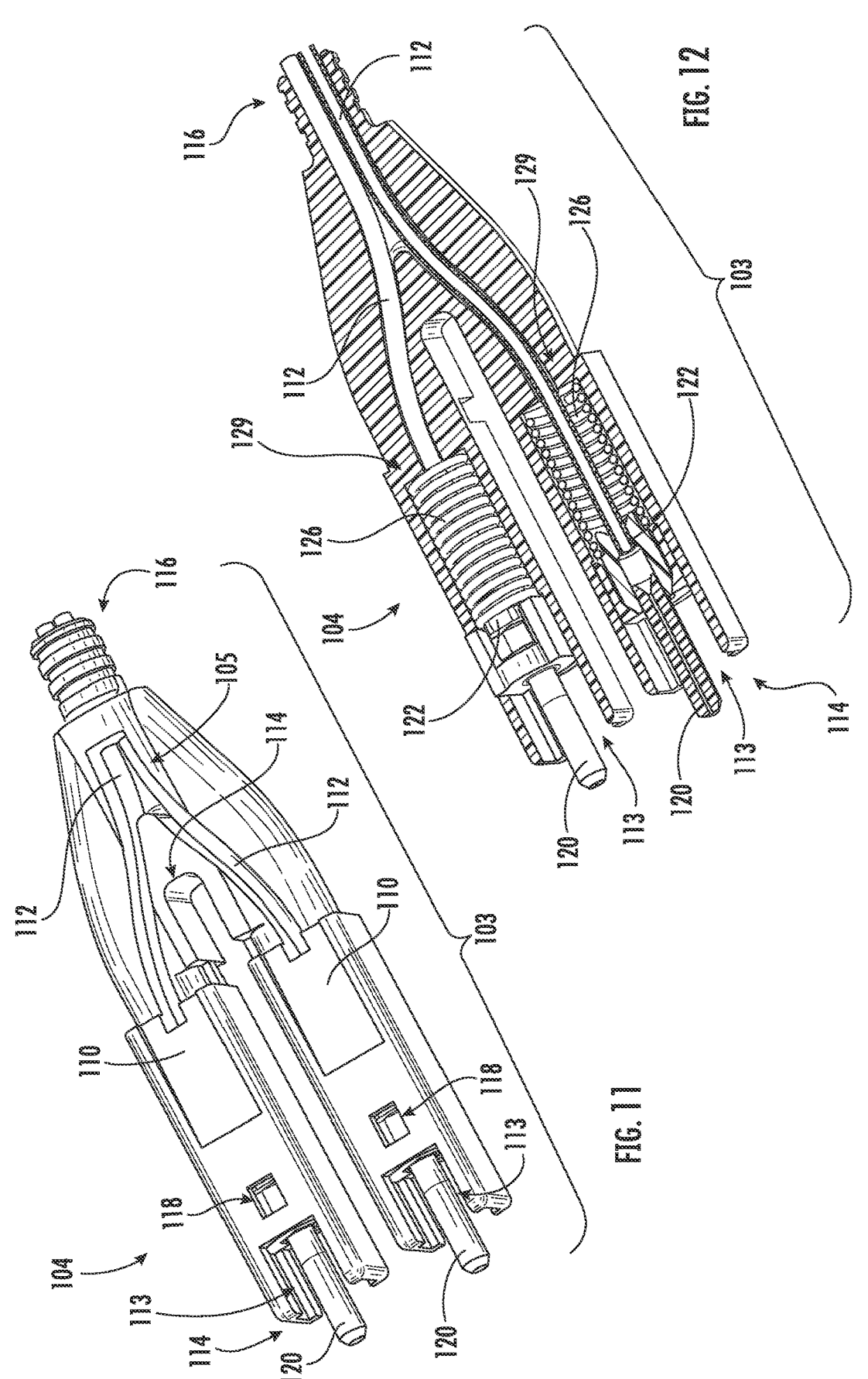

POLARITY CHANGEABLE OPTICAL CONNECTOR

PRIORITY APPLICATION

This application claims the benefit of priority of U.S. Provisional Application No. 63/315,642, filed on Mar. 2, 2022, the content of which is relied upon and incorporated herein by reference in its entirety.

FIELD OF THE DISCLOSURE

This disclosure relates to fiber-optic assemblies used in telecommunication systems, and in particular relates to duplex fiber optic connector assemblies and fiber optic cable assemblies permitting polarity reversal along with methods therefor.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables.

The capabilities of optical fiber, optical cable and fiber optic hardware continuously improve through research and innovation to meet the demands of increasing numbers of users. This is creating issues of density within even the most spacious data centers. As data centers become more densely configured one area of concern is cabling and airflow. Each piece of equipment within the data center is interconnected to other equipment or to different components within the same cabinet using jumper cables, Jumper cable assemblies typically comprise single fiber connectors and cables, i.e., simplex cable assemblies, usually arranged into sets of two, one input and one output. Large numbers of jumper cable assemblies bunched together are an impediment to maximized air flow, creating blockages and decreasing cooling efficiency in the data center, which can in turn affect performance. One method of mitigating this issue is to integrate the standard two-cable duplex cable assembly into a single cable duplex jumper, reducing by half the number of cables required to service a given data center. While this does indeed decrease the total cable count and serve the intended purpose of improving air flow, there are other issues that arise.

Most duplex and multi-fiber cable assemblies used in data centers follow a polarity scheme established by Addendum 7 to ANSI/TIA/EIA/568B.1, Guidelines for Maintaining Polarity Using Array Connectors ('568B.1-A7). Polarity for duplex jumpers is typically either dedicated A-to-B or A-to-A, depending upon the application. Harnesses that break out array connectors, such as Multi-fiber Push-On (MPO) or the like, from multi-fiber into single or double fiber cables with simplex or duplex connectors also follow the standards of polarity spelled out in '5688.1-A7. The craft can correct polarity miscues in typical duplex connector assemblies by disassembling and reassembling them into the preferred orientation. U.S. Pat. No. 6,565,262 discloses a duplex connector cable assembly employing a clip to secure two simplex connector cable assemblies together. It is obvious to one skilled in the art that the clip can be removed and the duplex connector cable assembly then reassembled into a different polarity configuration. However, the '262 patent does nothing to address the aforementioned cable crowding.

U.S. Pat. App. No. 2008/0226237 discloses a duplex connector cable assembly with a single cable that addresses cable crowding issues, but does not address reversing the polarity. Thus, there is an unresolved need for a single cable, duplex connector cable assembly with the capability of polarity reversal in a quick, easy and reliable manner.

SUMMARY OF THE DISCLOSURE

The present disclosure relates to a connector assembly and a corresponding method to reverse polarity of the connector. The method enables polarity reversal without bending/twisting optical fibers within the connector assembly.

In one embodiment, a method of reversing a polarity of a connector assembly, the connector assembly including a connector subassembly and a latch having a plurality of latch arms, the latch coupled to the connector subassembly is provided. The method comprising: removing a boot assembly from the connector subassembly; removing the latch from the connector subassembly by applying an upward force onto the latch; inverting one of the latch and the connector subassembly from a first orientation to a second orientation about a central axis of the latch or a central axis of the connector subassembly; applying the latch onto the connector subassembly at a front end of the connector subassembly.

In another embodiment, the method further comprising: disengaging the latch from the boot assembly coupled to the connector subassembly by applying a downward force onto a rear protrusion of the latch. In another embodiment, the latch has the first orientation before being removed from the connector pre-assembly, and wherein the inverting step includes rotating the latch 180 degrees about the central axis of the latch to the second orientation. In another embodiment, the inverting step further includes rotating the boot assembly 180 degrees about a central axis of the boot assembly. In another embodiment, the latch further includes at least one flex arm extending from a rear portion of the latch and a centering member extending from the rear portion of the latch, wherein the latch is coupled to the connector subassembly when the centering member is inserted into a centering slot of the connector subassembly. In another embodiment, removing the latch includes applying an upward force onto the latch such that the centering member is removed from the centering slot and then applying a lateral force such that the latch is removed from the connector subassembly. In another embodiment, removing the boot assembly includes sliding the boot assembly such that the boot assembly disengages from the connector subassembly. In another embodiment, the method further including coupling the boot assembly onto the connector subassembly and the latch in the second orientation. In another embodiment, the connector pre-assembly has the first orientation before removing the latch from the connector pre-assembly, and wherein the inverting step includes rotating the connector subassembly 180 degrees about a central axis of the connector subassembly to the second orientation. In another embodiment, the connector subassembly includes at least one ferrule assembly comprising a ferrule coupled to a ferrule holder, wherein the ferrule holder is within a clip carrier that has a protrusion along a bottom surface of the clip carrier that engages with the connector subassembly thereby coupling the ferrule and the ferrule holder to the connector subassembly. In another embodiment, the latch includes a pair of guide bodies on a front end of the latch that are received onto the front end of the connector subassembly.

In one embodiment, a method of assembling an optical fiber connector assembly and reversing the polarity of the optical fiber connector assembly is provided. The method comprising: inserting a ferrule into a connector subassembly; cleaving an optical fiber; inserting the optical fiber into a rear end of the connector subassembly and into an internal bore of the ferrule; securing the optical fiber to ferrule with an adhesive; coupling a boot assembly to a rear end of the connector subassembly; and coupling a latch onto a front end of the connector subassembly, wherein a rear end of the latch is coupled to the boot assembly; the rear end includes at least one flex arm and a centering member extending from the rear portion of the latch, wherein the centering member engages with a centering slat of the connector subassembly to couple the latch to the connector subassembly.

In another embodiment, cleaving the optical fiber occurs after the optical fiber is inserted into the rear end of the connector subassembly and before the optical fiber is inserted into the internal bore of the ferrule. In another embodiment, the method further including: disengaging the latch from the boot assembly; removing the boot assembly; removing the latch from the connector assembly by applying a force onto the latch such that the centering member of the latch is removed from a centering slot of the connector subassembly; inverting the latch or the connector subassembly from a first orientation to a second orientation about a central axis of the respective latch or the respective connector subassembly; and applying the latch onto the connector subassembly. In another embodiment, the inverting step includes rotating the latch 180 degrees about the central axis of the latch to form an inverted latch; and wherein the applying the latch step includes applying the inverted latch onto the connector subassembly. In another embodiment, the inverting step further includes rotating the boot assembly 180 degrees about a central axis of the boot assembly. In another embodiment, the inverting step includes rotating the connector subassembly 180 degrees about the central axis of the connector subassembly to form an inverted connector subassembly; and wherein the applying the latch step includes applying the latch onto the inverted connector subassembly.

In one embodiment, an optical fiber connector assembly is provided. The optical fiber connector assembly comprising: a duplex optical fiber connector assembly comprising: a connector subassembly including a ferrule coupled to a ferrule holder, the ferrule and the ferrule holder coupled to the connector subassembly, and the ferrule extending beyond a front end of the connector subassembly; a boot assembly coupled to the connector subassembly; and a latch having a plurality of latch arms, the latch having a front portion coupled to the front end of the connector subassembly and a rear portion coupled to the boot assembly; and the rear portion includes at least one flex arm and a centering member extending from the rear portion of the latch, wherein the centering member engages with a centering slot of the connector subassembly.

In another embodiment, the rear portion of the latch further includes a rear protrusion that engages with the boot assembly. In another embodiment, the boot assembly includes a head portion and a tail portion coupled together, and wherein the head portion includes a cut out, wherein the rear protrusion engages with the cut out on the head portion. In another embodiment, the optical fiber connector assembly further including a clip carrier having a protrusion along a bottom surface of the clip carrier that engages with the connector subassembly thereby coupling the ferrule and the ferrule holder to the connector subassembly, wherein the ferrule and the ferrule holder are housed within the clip carrier. In another embodiment, the latch includes guide bodies connected to the plurality of latch arms, wherein the guide bodies are received in recesses on the front end of the connector body.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 8 is a perspective view of the latch of FIG. 5 assembled onto a connector base body of the connector assembly of FIG. 3;

FIG. 9 is an enlarged rear perspective view of the latch and the connector base body of FIG. 8;

FIG. 10 is a cross sectional view of the latch and the connector base body of FIGS. 8 and 9;

FIG. 11 is a perspective view of the connector base body of the connector assembly of FIG. 3;

FIG. 12 is a cross sectional perspective view of the connector base body of FIG. 11;

FIG. 25 is a perspective view of a connector base body of the connector assembly of

FIG. 22;

DETAILED DESCRIPTION

Various embodiments will be clarified by examples in the description below. In general, the present disclosure relates to a connector assembly and a corresponding method to reverse polarity of the connector. The method enables polarity reversal without bending/twisting optical fibers within the connector assembly.

Figures 1, 2:
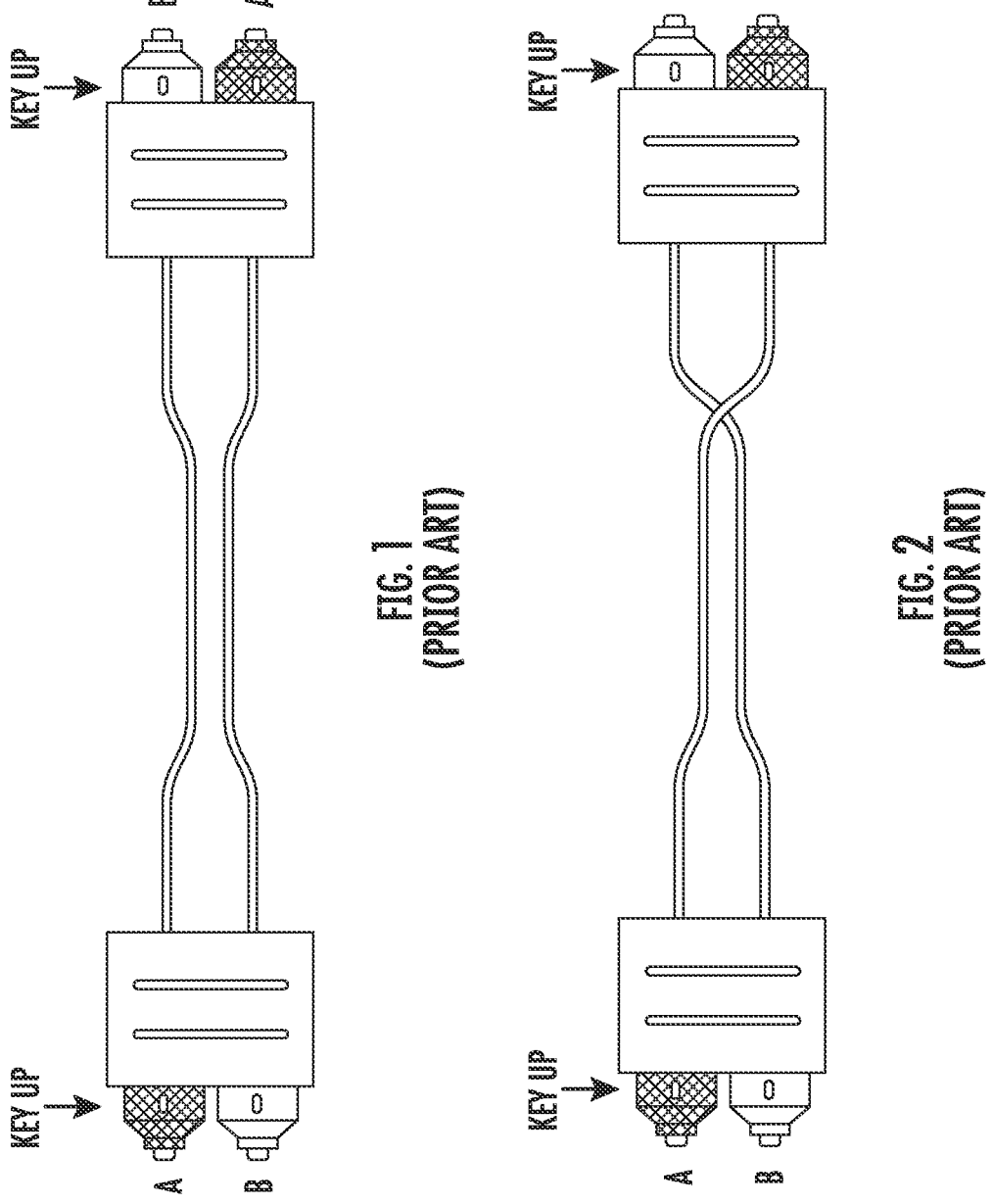
FIG. 1 is a schematic representation of a standard A-B duplex jumper cable polarity configuration as known in the art.
FIG. 2 is a schematic representation of a standard A-B duplex jumper cable polarity configuration as known in the art.

FIG. 1 shows a typical A-to-B polarity configuration and FIG. 2 shows an A-to-A polarity configuration, which are both known in the art. In the past each polarity configuration was either fixed for each cable assembly or was reversible by manually disassembling the cable assembly and reassembling it in the desired polarity orientation. Duplex jumper cables were typically made from two conjoined simplex jumper cables, with the fiber optic connectors held together by means of a clip-like device to create the duplex. This construction required routing of two cables per cable assembly and resulted in crowding of patch panels, airflow issues, tangling of cables and the like.

Single cable duplex jumpers as known in the art greatly improved the issue of crowding and airflow, but sacrificed the ability to reverse polarity. The craft enjoyed the improved accessibility and airflow, but lost the ability to change polarity from A-to-B to A-to-A, or vice versa as the need arose. Conventional, single cable duplex jumpers could not be altered in the field to change polarity if required. Therefore, if the polarity of such a single cable duplex jumper was incorrect it would require replacement. If a polarity issue arose within another component in the data center, such as with a module or fiber optic cable harness, the inability to change polarity of the fiber optic cable assembly in the field required replacement of other components.

Optical Fiber Connector Assembly 100

Figure 3:
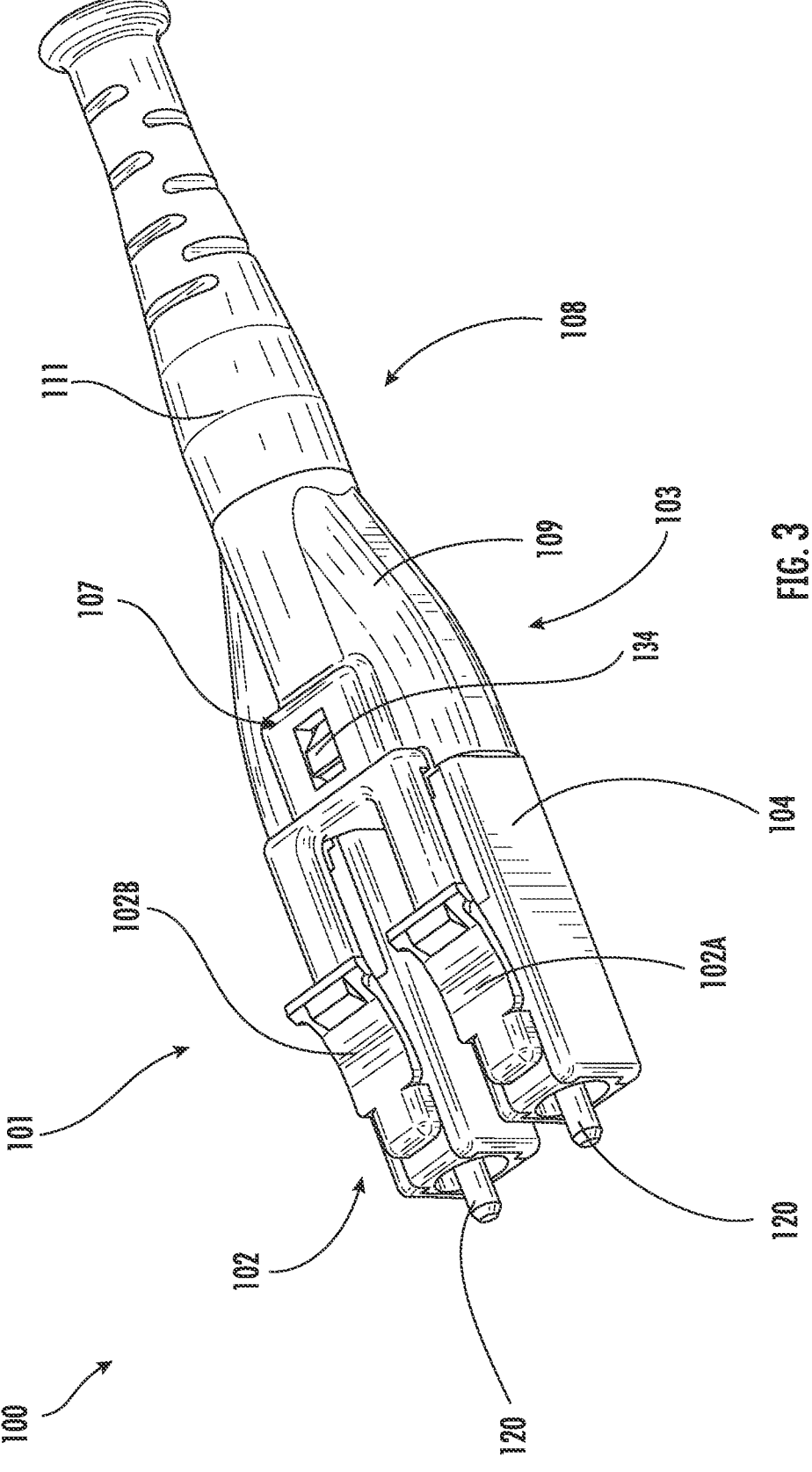
FIG. 3 is a perspective view of a connector assembly in accordance with the present disclosure.
Figure 4:
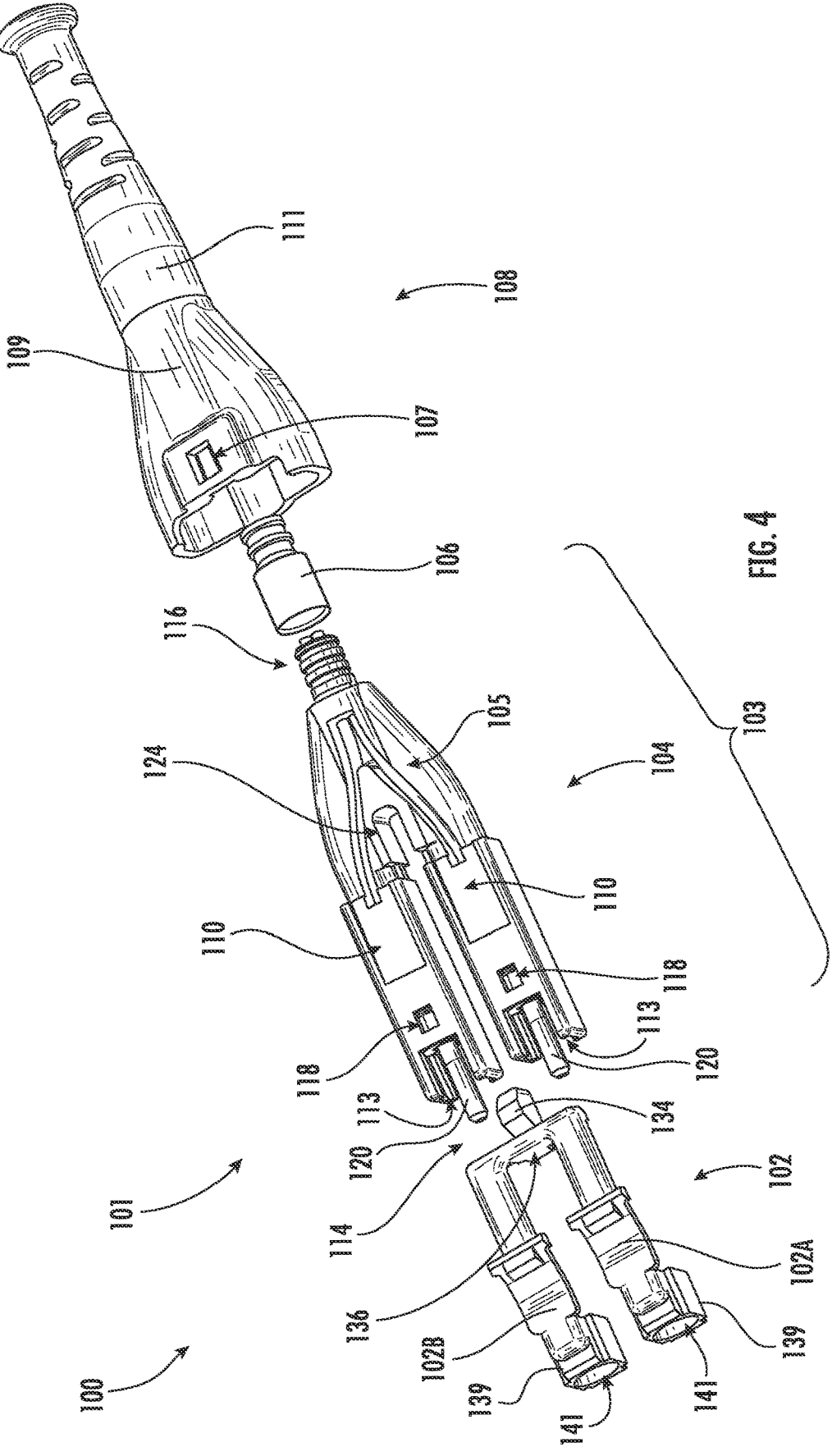
FIG. 4 is an exploded view of the connector assembly in FIG. 3.
Figures 5, 6, 7:
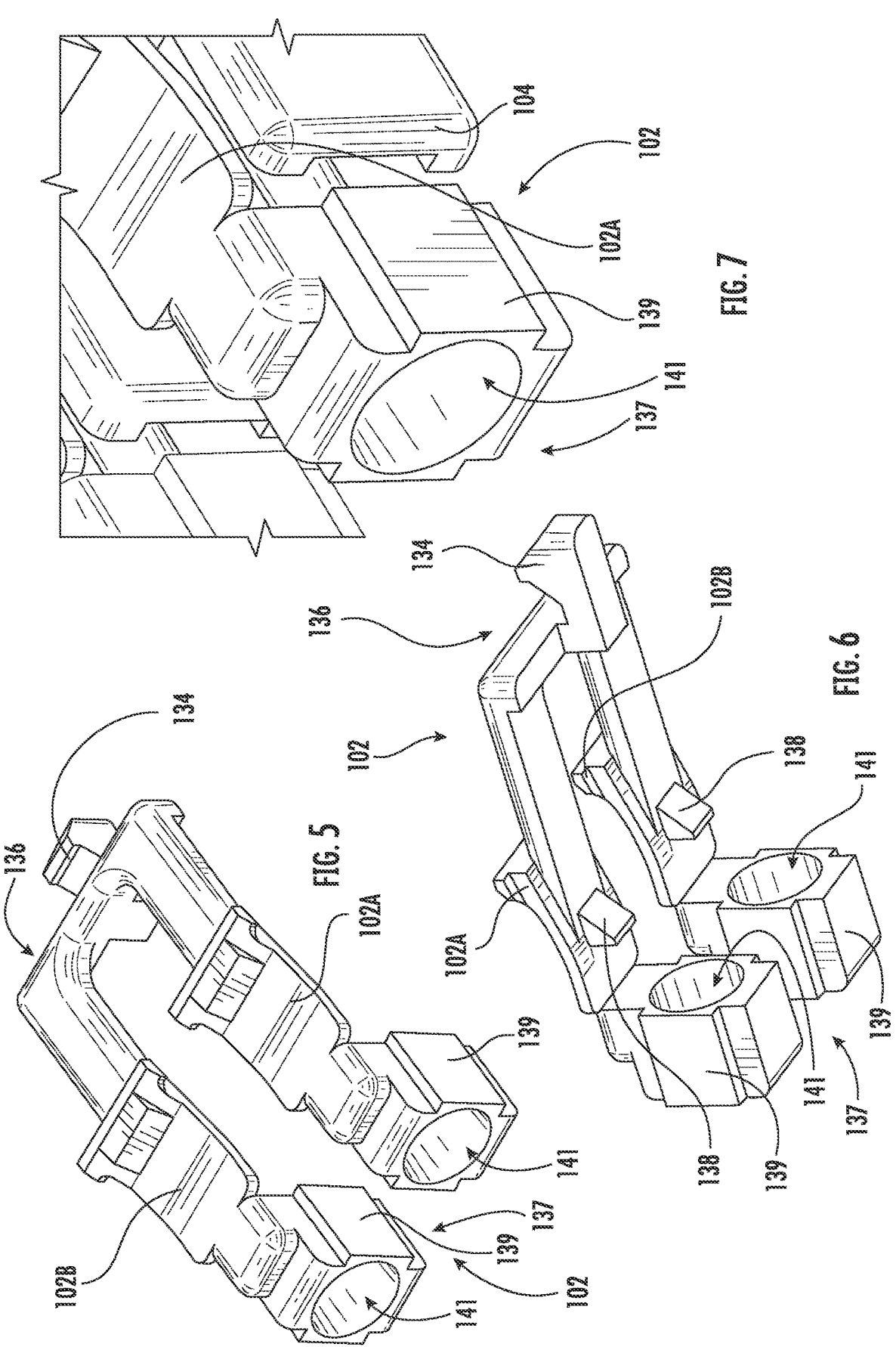
FIG. 5 is a perspective view of a latch of the connector assembly of FIG. 3.
FIG. 6 is a rear perspective view of the latch of FIG. 5.
FIG. 7 is an enlarged perspective view of the latch of FIG. 5.

Referring to FIGS. 3-4, various views of an optical fiber connector assembly 100 are shown. Optical fiber connector assembly 100 includes a connector 101 having a latch 102, connector subassembly 103, crimp band 106, and a boot assembly 108 each of which are coupled to each other to form optical fiber connector assembly 100.

Connector 101 is configured to terminate the end of an optical fiber. Connector 101 mechanically couple and align cores of optical fibers so light can pass. As shown, connector 101 is a duplex connector. However, it is contemplated that in alternate embodiments, other suitable connectors may be used such as simplex connectors, for example.

Referring now to FIGS. 5-8, latch 102 is shown. Latch 102 is configured to assist in coupling optical fiber connector assembly 100 to relevant receiving structures (e.g., receiver modules, etc.). Latch 102 is coupled to connector base body 104 where front end 137 of latch 102 is received onto front end 114 of connector base body 104. In particular, front end 137 includes guide bodies 139 that extend from latch arms 102A, 102B as shown, and guide bodies 139 couple to front end 114 of connector base body 104 as discussed in greater detail below. As shown, guide bodies 139 are received into recess 113 of connector base body 104 at front end 114 of connector base body 104 such that guide bodies 139 contact front end 114 of connector base body 104 and are contoured to the shape of connector base body 104 at front end 114. Guide bodies 139 include apertures 141 that define and extend passages through which ferrules 120 extend when connector 101 is assembled (FIG. 3).

Latch 102 is also configured to reverse the polarity of the optical fiber connector assembly 100 as discussed in greater detail herein. As shown in FIGS. 5-8, latch 102 includes latch arms 102A, 1028 that are joined at a rear end 136 of latch 102 where the rear end 136 includes a rear protrusion 134. Latch arms 102A, 102B are generally parallel; however, it is within the scope of the present disclosure that in alternate embodiments, latch arms 102A, 102B are not parallel with each other. As also shown, each latch arm 102A, 102B includes a retention protrusion 138 that engages with connector base body 104 to couple latch 102 onto connector base body 104. Referring briefly to FIGS. 9 and 10, retention protrusion 138 extends into a window 118 of connector base body 104 and in turn, latches retention protrusion 138 into place on connector base body 104. It is within the scope of the present disclosure, that alternate coupling configurations of latch 102 and connector base body 104 may be used (e.g., frictional engagement, etc.). Additional details regarding installation and removal of latch 102 onto connector base body 104 are discussed in greater detail herein.

Rear protrusion 134 is configured to latch onto boot assembly 108 (in cut out 107) and provides additional security of latch 102 onto connector base body 104 of connector assembly 100.

In some embodiments, latch 102 is made of polymeric materials such as Ultem®1000 as manufactured by SABIC and other suitable materials. However, in alternate embodiments, it is contemplated that other suitable materials may be used for latch 102.

Referring now to FIGS. 11 and 12, connector sub-assembly 103 is shown. Connector subassembly 103 includes a connector base body 104, a ferrule 120, and a ferrule holder 122 where connector base body 104 is configured to receive ferrule 120 and ferrule holder 122. Also, as mentioned previously, latch 102 is received onto front end 114 of connector body 104. In particular, in some embodiments, connector base body 104 includes recesses 113 configured to receive guide bodies 139. As shown, connector base body 104 includes routing slots 105, latch arm relief 110, window 118, front end 114, and rear end 116.

Routing slots 105 are configured to hold fiber guide tubes 112 and optical fiber 130, which is housed within fiber guide tube 112 which extends from a rear end portion of connector base body 104 to within ferrule holder 122 to help guide the insertion of optical fiber 130 (FIG. 18) via fiber guide tubes 112 into ferrule 120. Routing slots 105 lead to recess 129 which receives spring 126. Spring 126 is configured to interact with walls of connector base body 104 to bias ferrule holder 122 and ferrule 120.

As mentioned previously, connector base body 104 includes latch arm relief 110. Latch arm relief 110 is configured to provide relief to latch arm 102 as applied by boot assembly 108 when removing boot assembly 108 from connector assembly 100 as discussed below.

Connector base body 104 includes a window 118 near front end 114. Window 118 is adjacent to latch arm relief 110 and provides access to optical fiber 130 as discussed in greater detail herein. However, it is contemplated that in alternate embodiments, connector base body 104 does not include a window 118 and optical fiber 130 is processed prior to insertion into connector base body 104 and ferrule 120.

Figures 13, 14, 15:
FIG. 13 is a perspective view of a ferrule assembly including a ferrule and a ferrule holder.
FIG. 14 is a perspective view of the ferrule assembly of FIG. 13 enclosed in a clip carrier.
FIG. 15 is a sectional perspective view illustrating the ferrule assembly and the clip carrier of FIG. 14 enclosed within the connector base body.

Front end 114 of connector base body 104 is configured to receive ferrule 120 and ferrule holder 122. Referring now to FIGS. 13 and 14, a ferrule assembly 125 is shown. Ferrule assembly 125 includes ferrule 120 and ferrule holder 122. As shown, ferrule 120 is received into ferrule holder 122. As also shown, ferrule holder 122 includes a ferrule holder window 123 distal to an end face of ferrule 120. Stated another way, ferrule holder window 123 is downstream of an end face of ferrule 120. Ferrule holder window 123 provides access to optical fiber 130 that is fed into ferrule 120, and ferrule holder window 123 enables treatment or processing of optical fiber 130 prior to being fed into ferrule 120 as discussed in greater detail herein.

Referring now to FIG. 14, ferrule assembly 125 is coupled to a clip carrier 128. Clip carrier 128 has latch arms 128A, 1288 that engage with internal surfaces of connector base body 104 as shown in at least FIGS. 15 and 16. In particular, latch arms 128A, 1288 engage with connector base body 104 (FIGS. 15 and 16) such that window 118 is aligned with ferrule holder window 123 as shown in FIG. 17 thereby enabling treatment or processing of incoming optical fiber 130 as discussed in greater detail herein.

Figures 16, 17, 18:
FIG. 16 is a front perspective view of a portion of the connector base body with the ferrule.
FIG. 17 is a perspective view of the connector base body with the ferrule assembly.
FIG. 18 is a sectional perspective view of the connector base body and the ferrule assembly illustrating insertion of an optical fiber within the connector base body and the ferrule assembly.

Referring briefly to FIG. 18, a schematic of laser treatment of incoming optical fiber 130 is shown. As shown, window 118 provides access to optical fiber 130 such that laser energy 131 can be administered to optical fiber 130 through window 118. In this way, laser energy 131 cleaves optical fiber 130 prior to the insertion of cleaved optical fiber 130 into an internal bore 121 of ferrule 120. As shown, ferrule 120 includes a bonding agent 127 seated on internal bore 121.

Bonding agent 127 may be pre-loaded or stored within ferrule 120 (e.g., bonding agent 127 may be pre-loaded into the internal bore 121 by the manufacturer of ferrule 120) for a significant amount of time (e.g., at least an hour, a day, a year, etc.) before inserting optical fiber 130 into internal bore 121. In some embodiments, bonding agent 127 may be a free-flowing powder material coupled within internal bore 121 via compression. In an alternate embodiment, bonding agent 127 may alternatively be extruded. In some embodiments, bonding agent 127 is not included in internal bore 121 as discussed below.

Discussion of possible bonding agents are disclosed in U.S. Pat. No. 8,702,322, and additional details relating to such bonding agents can be found in U.S. Pat. Nos. 8,696, 215 and 9,568,686, the disclosures of which are incorporated herein by reference.

In addition to some residual heat generated by laser energy 131, additional laser energy 133 can be administered on or adjacent to the end face of ferrule 120 such that the heat generated by laser energy 133 melts at least a portion of bonding agent 127 and expanding ferrule 120 thereby enabling optical fiber 130 to adhere to ferrule 120.

As mentioned previously, in some embodiments, ferrule 120 does not include bonding agent 127 within internal bore 121. In such embodiments, optical fiber 130 (FIG. 5) is inserted directly into ferrule 120 through internal bore 121 such that at least a portion of optical fiber 130 protrudes outwardly from front end of ferrule 120.

Laser energies 131, 133 can be administered by a laser apparatus (not shown) that is commonly known in the art.

Rear end 116 of connector base body 104 is configured to receive crimp band 106. In a manner not shown herein, a fiber optic cable providing optical fiber 130 (FIG. 18) also includes one or more layers of material (e.g., strength layer of aramid yarn) that may be crimped onto rear end 116 of connector base body 104. A crimp band (or "crimp ring") 106 may be provided for this purpose, Additionally, a strain-relieving boot (e.g., boot assembly 108) may be placed over the crimped region and extend rearwardly to cover a portion of the fiber optic cable. Variations of these aspects will be appreciated by persons familiar with the design of fiber optic cable assemblies. For example, other ways of securing a fiber optic cable to connector base body 104 are also known and may be employed in some embodiments.

Figures 19, 20, 21:
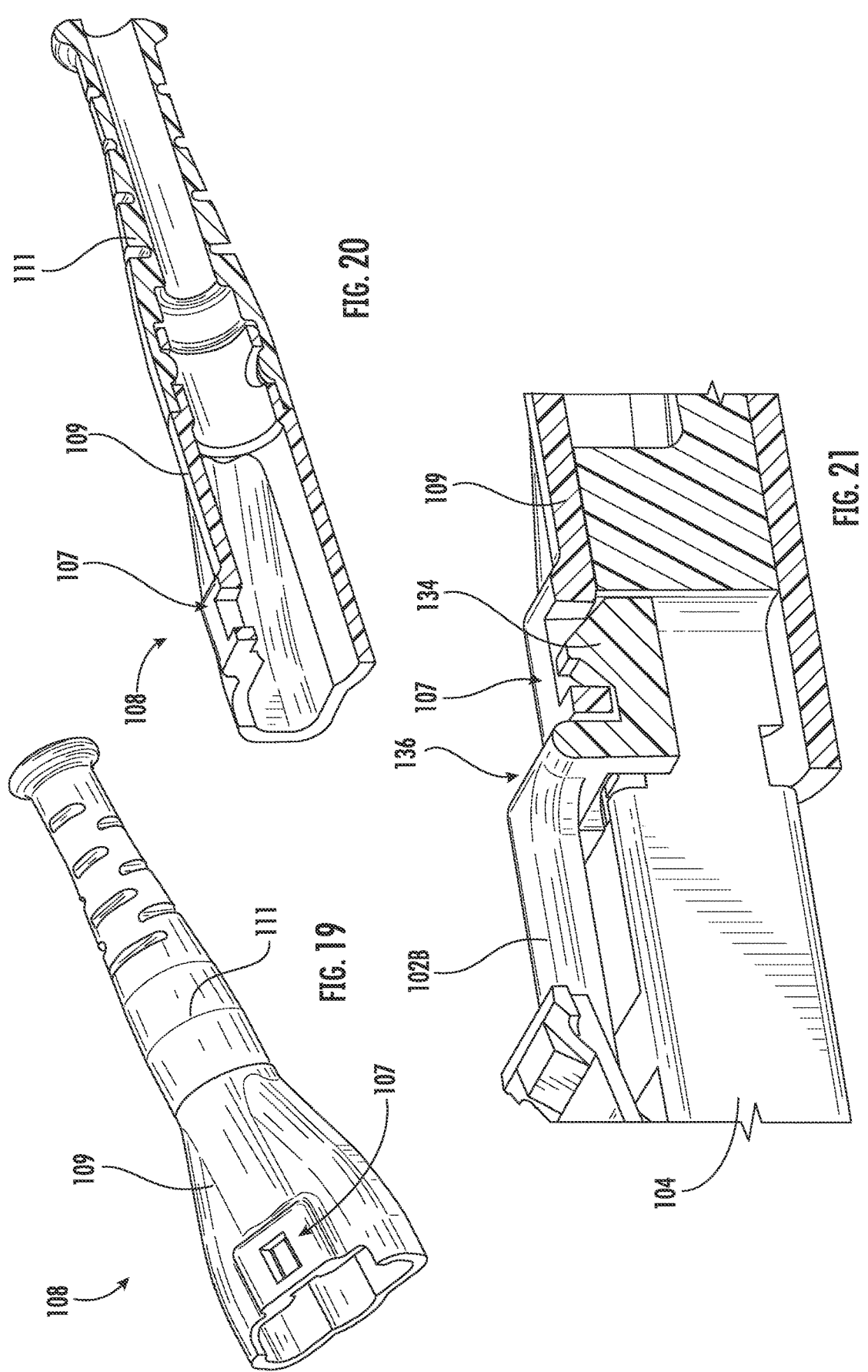
FIG. 19 is a perspective view of a boot assembly of the connector assembly of FIG. 3.
FIG. 20 is a sectional view of the boot assembly of FIG. 19.
FIG. 21 is a sectional view of the boot assembly, the latch, and the connector base body illustrating how the latch and the boot assembly are coupled.

Boot assembly 108 is shown in FIGS. 19 and 20 and is configured to limit radial movement of optical fiber cable and to actuate latch 102 during assembly or disassembly of optical fiber connector assembly 100. Boot assembly 108 includes head portion 109 and a tail portion 111 that are coupled together. In some embodiments, head portion 109 is coupled to tail portion 111 in a snap fit configuration. In an alternate embodiment, boot assembly 108 could be constructed as an elastomer overmolded onto a boot assembly substrate. However, it is contemplated that in other alternate embodiments, alternate coupling configurations may be used. Boot assembly 108 provides a push pull user experience when assembling and disassembling connector 101 as discussed in greater detail herein. As shown, boot assembly 108 also includes an aperture 132 within a cut out 107 to receive rear protrusion 134 of latch 102 as discussed in greater detail herein, Stated another way, cut out 107 (that includes aperture 132) is sized and configured to receive rear protrusion 134 of latch 102 such that rear protrusion can be coupled to boot assembly 108 as discussed in greater detail herein. In addition, boot assembly 108 provides an advantage of being spatially efficient thereby enabling a high packing density of optical fiber connector assemblies 100 in certain applications (e.g., data centers, etc.).

To assemble optical fiber connector assembly 100, optical fiber(s) 130 and ferrule assembly 125 are inserted into connector base body 104 as shown in at least FIG. 11. Then, crimp band 106 is applied onto rear end 116 of connector base body 104. Latch 102 is then applied onto connector base body 104 from front end 114 such that retention protrusion 138 of each latch arm 102A, 102B engage with a corresponding arm of connector base body 104, and guide bodies 139 are received into recesses 113 of connector base body 104 such that guide bodies 139 mesh and/or contact with front end 114 of connector base body 104. In some embodiments, retention protrusion 138 engages with window 118 of connector base body 104. Boot assembly 108 is then applied onto connector base body 104 from rear end 116 so that rear protrusion engages with cut out 107 of boot assembly 108.

Optical Fiber Connector Assembly 100

Figure 22:
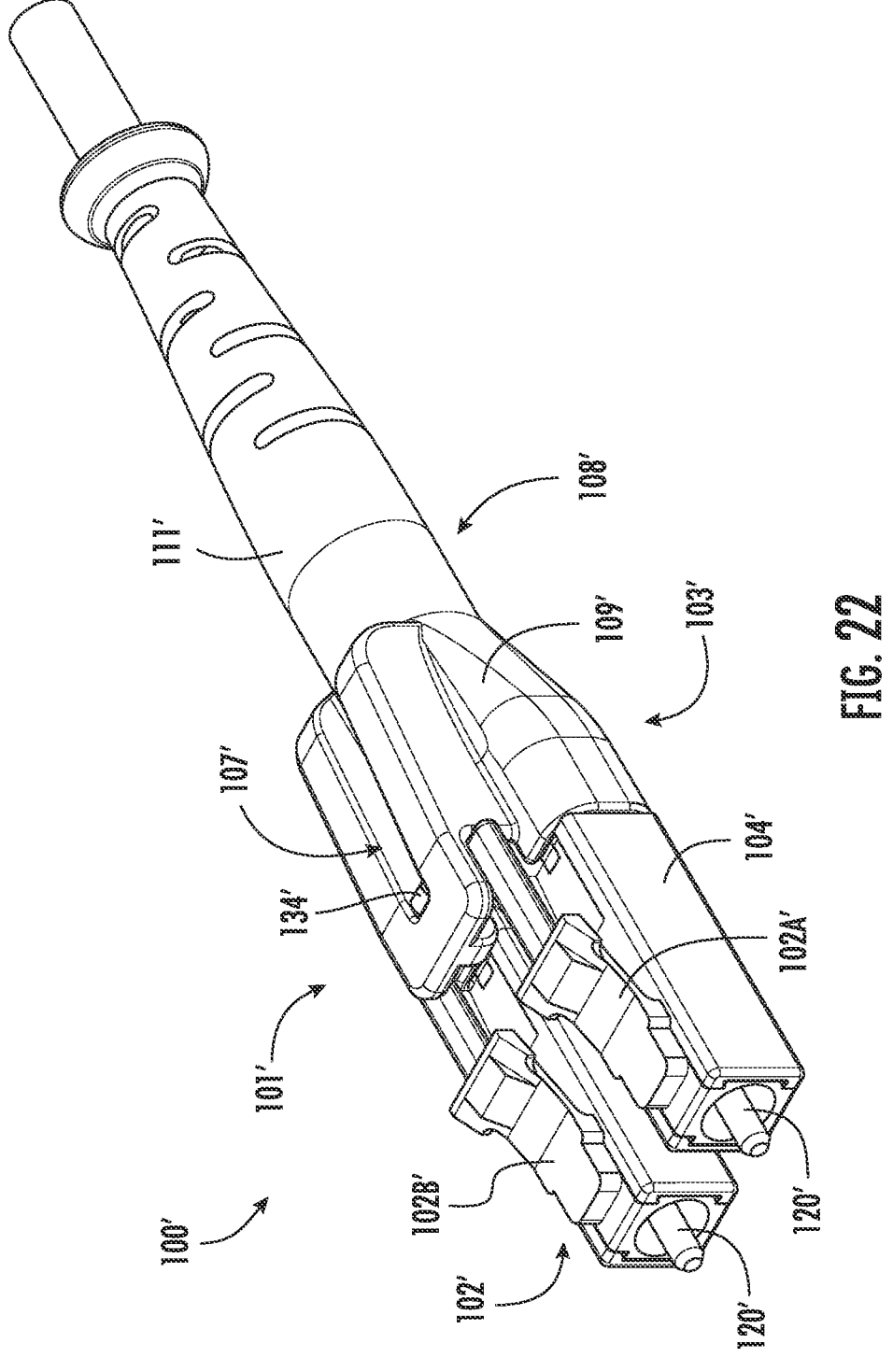
FIG. 22 is a perspective view of an alternate embodiment of the connector assembly of FIG. 3 in accordance with the present disclosure.
Figure 23:
FIG. 23 is an exploded view of the connector assembly in FIG. 22.

Referring to FIGS. 22-23, various views of an alternate optical fiber connector assembly 100' are shown. Similar to optical fiber connector assembly 100', optical fiber connector assembly 100' includes a connector 101' having a latch 102', connector subassembly 103', crimp band 106', and a boot assembly 108' each of which are coupled to each other to form optical fiber connector assembly 100'.

Connector 101' is configured to terminate the end of an optical fiber. Connector 101' is configured to mechanically couple to an adapter or other receptacle and align cores of optical fibers with those in a mating connector or other device on the opposite side of the receptacle so light can pass. As shown, connector 101' is a duplex connector. However, it is contemplated that in alternate embodiments, other suitable connectors may be used such as simplex connectors, for example.

Figure 24:
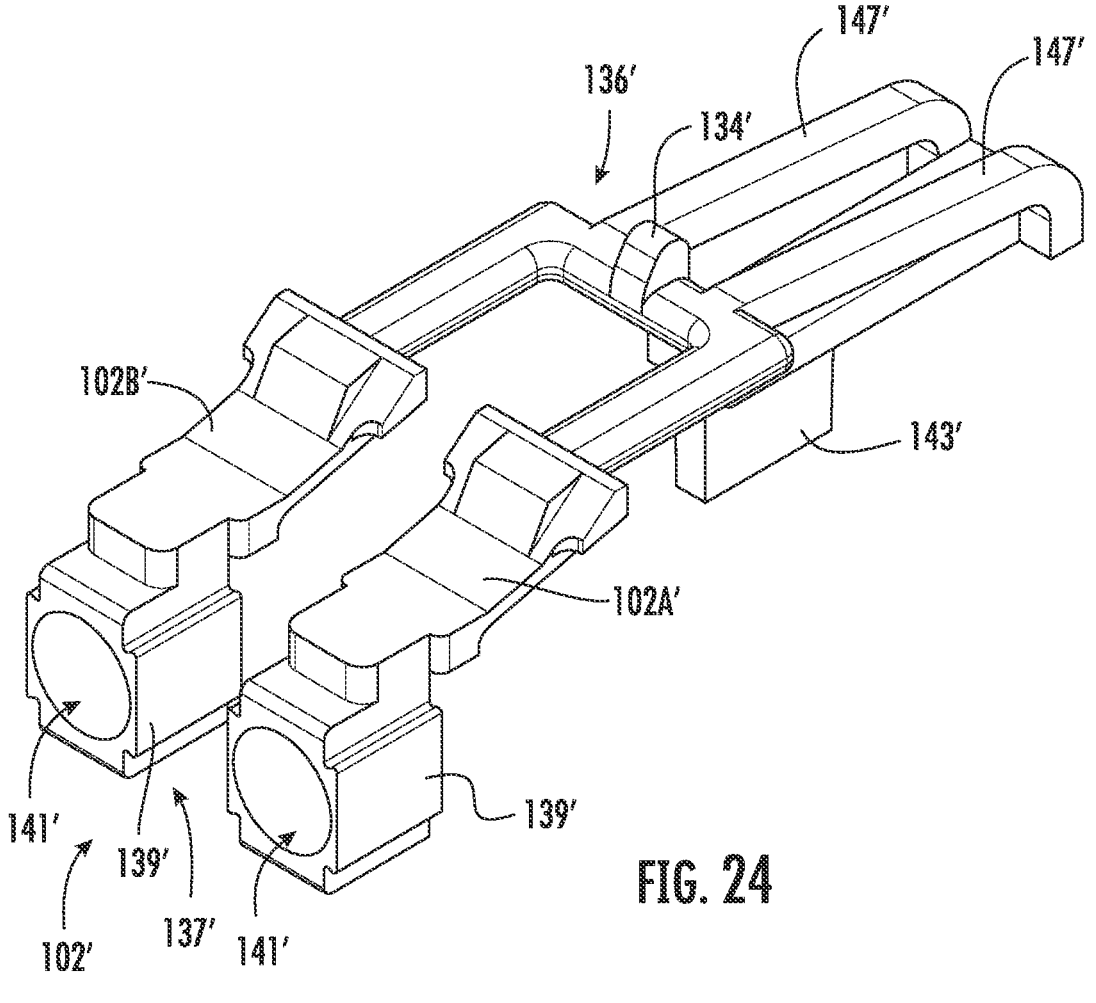
FIG. 24 is a perspective view of a latch of the alternate embodiment of the connector assembly of FIG. 22.

Referring now to FIG. 24, latch 102' is shown. Latch 102' is configured to assist in coupling optical fiber connector assembly 100' to relevant receiving structures (e.g., receptacles/adapters, receiver modules, etc.). Latch 102' is coupled to connector base body 104' where front end 137' of latch 102' is received onto front end 114' of connector base body 104'. In particular, front end 137' includes guide bodies 139' that extend from latch arms 102A', 102B' as shown, and guide bodies 139' couple to front end 114' of connector base body 104' as discussed in greater detail below. As shown, guide bodies 139' are received into recess 113 of connector base body 104' at front end 114' of connector base body 104' such that guide bodies 139' contact front end 114' of connector base body 104' and are contoured to the shape of connector base body 104' at front end 114'. Guide bodies 139' include apertures 141' that define passages through which ferrules 120' extend when connector 101' is assembled (FIG. 22).

Latch 102' is also configured to reverse the polarity of the optical fiber connector assembly 100' as discussed in greater detail herein. As shown in FIG. 24, latch 102' includes latch arms 102A', 1028' that are joined at a rear end 136' of latch 102' where the rear end 136' includes a rear protrusion 134'. Latch arms 102A', 102B' are generally parallel; however, it is within the scope of the present disclosure that in alternate embodiments, latch arms 102A', 102B' are not parallel with each other. As also shown, latch 102' also includes a centering member 143' that is configured to be inserted into a centering slot 145' and maintain the positioning of latch 102' when latch 102' is installed onto connector base body 104' to couple latch 102' onto connector base body 104'. In addition, latch 102' further includes a pair of bowflex arms 147' (also referred to as flex arms 147') extending from rear end 136' and are positioned relative to connector base body 104' by centering member 143' as discussed above. Additional details regarding installation and removal of latch 102' onto connector base body 104' are discussed in greater detail herein.

Rear protrusion 134' is configured to latch onto boot assembly 108' and provides additional security of latch 102' onto connector base body 104 of connector assembly 100.

In some embodiments, latch 102' is made of polymeric materials such as Ultem®1000 as manufactured by SABIC and other suitable materials. However, in alternate embodiments, it is contemplated that other suitable materials may be used for latch 102'.

Figure 25:
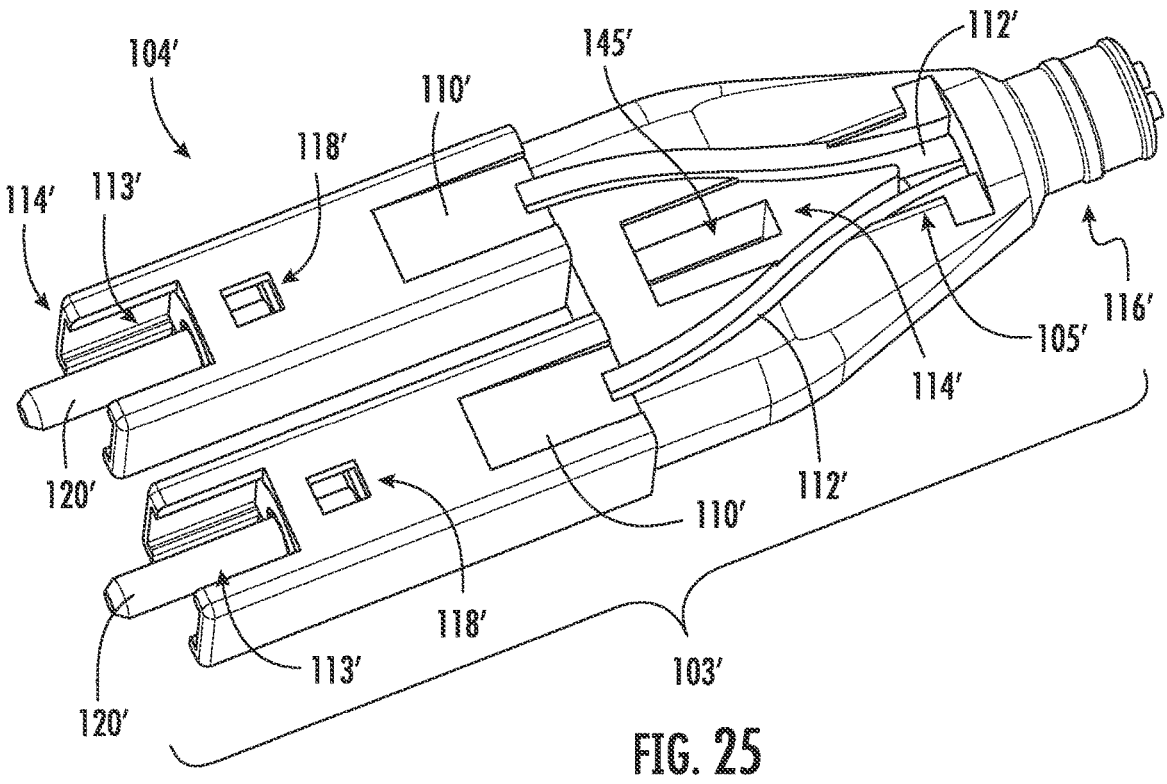
Figure 26:
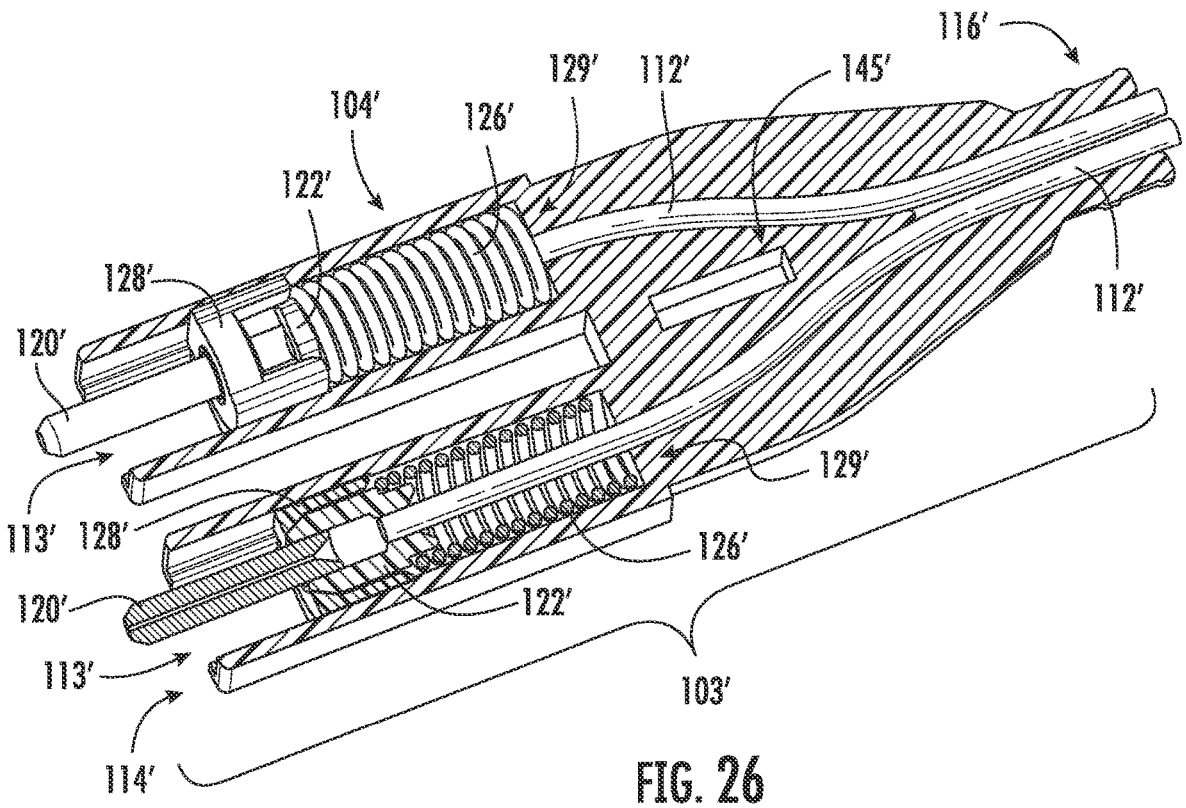
FIG. 26 is a cross sectional perspective view of the connector base body of FIG. 25.

Referring now to FIGS. 25 and 26, connector sub-assembly 103' is shown. Connector subassembly 103' includes a connector base body 104', a ferrule 120', and a ferrule holder 122' where connector base body 104 is configured to receive ferrule 120' and ferrule holder 122'. Also, as mentioned previously, latch 102' is received onto front end 114' of connector body 104'. In particular, in some embodiments, connector base body 104' includes recesses 113' configured to receive guide bodies 139'. As shown, connector base body 104' includes routing slots 105', latch arm relief 110', window 118', front end 114', and rear end 116'.

Routing slots 105' are configured to hold fiber guide tubes 112' and optical fiber 130 (FIG. 18), which is housed within fiber guide tube 112' which extends from a rear end portion of connector base body 104' to within ferrule holder 122' to help guide the insertion of optical fiber 130 via fiber guide tubes 112' into ferrule 120'. Routing slots 105' lead to recess 129' which receives spring 126'. Spring 126' is configured to interact with walls of connector base body 104' to bias ferrule holder 122' and ferrule 120'.

As mentioned previously, connector base body 104' includes latch arm relief 110'. Latch arm relief 110' is configured to provide relief to latch arm 102' as applied by boot assembly 108' when removing boot assembly 108' from connector assembly 100' as discussed below.

Connector base body 104' includes a window 118' near front end 114', Window 118' is adjacent to latch arm relief 110' and provides access to optical fiber 130 as discussed in greater detail herein. However, it is contemplated that in alternate embodiments, connector base body 104' does not include a window 118' and optical fiber 130 is processed prior to insertion into connector base body 104' and ferrule 120'.

Figure 27:
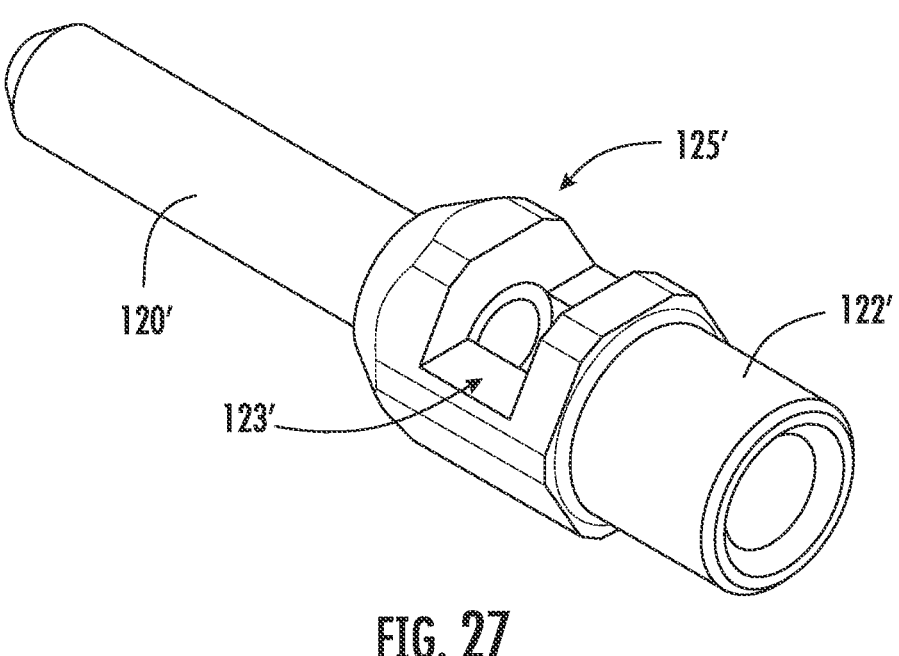
FIG. 27 is a perspective view of an alternate embodiment of a ferrule assembly including a ferrule and a ferrule holder.

Front end 114' of connector base body 104' is configured to receive ferrule 120' and ferrule holder 122', Referring now to FIG. 27, a ferrule assembly 125' is shown. Ferrule assembly 125' includes ferrule 120' and ferrule holder 122'. As shown, a rear portion of ferrule 120' is received into ferrule holder 122'. As also shown, ferrule holder 122' includes a ferrule holder window 123' distal to a rear end of ferrule 120'. Stated another way, ferrule holder window 123' is downstream of a rear end of ferrule 120'. Ferrule holder window 123' provides access to optical fiber 130 that is fed into ferrule 120', and ferrule holder window 123' enables treatment or processing of optical fiber 130 prior to being fed into ferrule 120' as discussed in greater detail herein.

Figure 28:
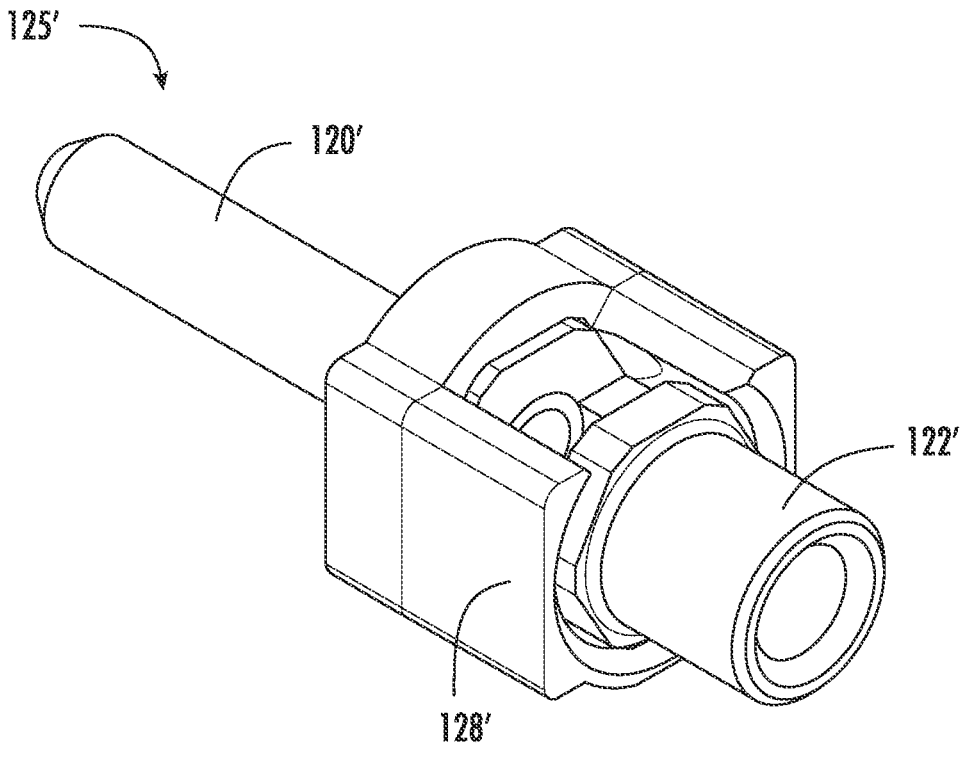
FIG. 28 is a perspective view of the ferrule assembly of FIG. 27 enclosed in an alternate embodiment of a clip carrier.
Figure 28A:
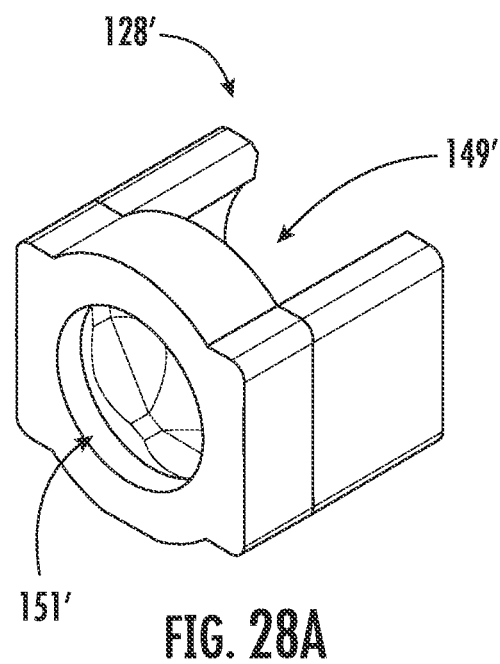
FIG. 28A is a perspective view of the clip carrier of FIG. 28.
Figure 28B:
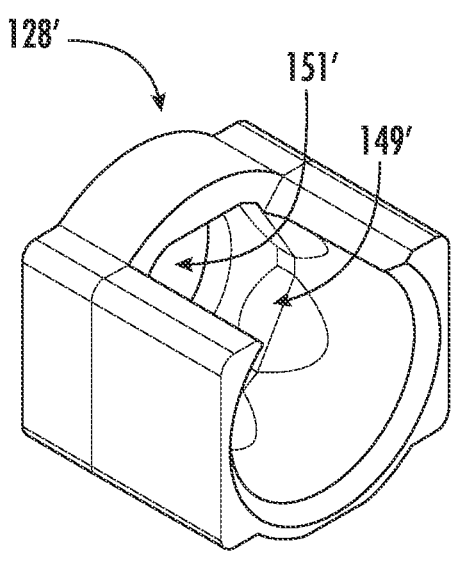
FIG. 28B is a rear perspective view of the clip carrier of FIG. 28.
Figure 28C:
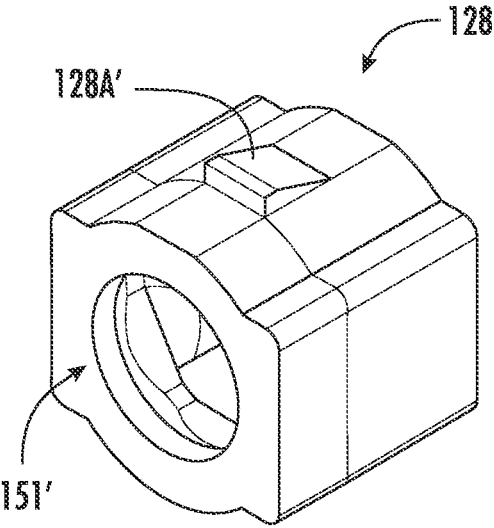
FIG. 28C is a bottom perspective view of the clip carrier of FIG. 28.
Figure 29:
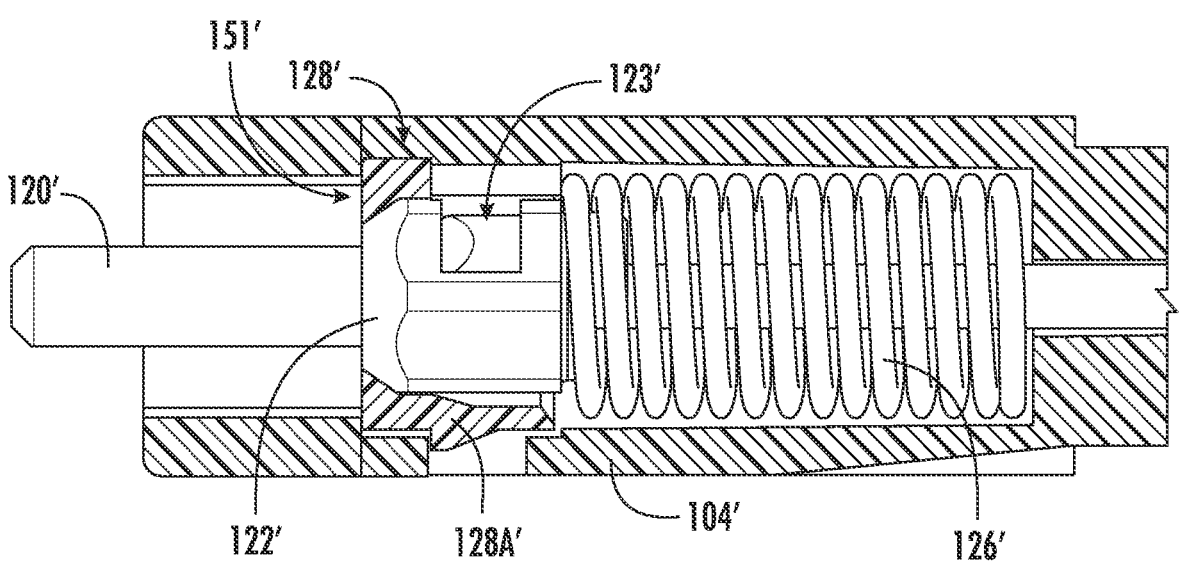
FIG. 29 is a cross sectional view illustrating the ferrule assembly and the clip carrier of FIG. 28 enclosed within the connector base body.

Referring now to FIG. 28, ferrule assembly 125' is coupled to a clip carrier 128'. In alternate embodiments, ferrule assembly 125 (FIGS. 13 and 14) may be coupled to clip carrier 128'. As shown in FIGS. 28A-28C, clip carrier 128' provides a housing structure with an aperture 151' through which a ferrule 120, 120' extends and a receiving area 149' in fluid communication with aperture 151' where receiving area 149' receives ferrule assembly 125, 125'. Clip carrier 128' also has a singular protrusion 128A' along a bottom surface of clip carrier 128' that engages with internal surfaces of connector base body 104' as shown in at least FIG. 29. In particular, latch arm 128A' engages with connector base body 104' (FIG. 29) such that window 118' is aligned with ferrule holder window 123' similar to what is shown in FIG. 17 thereby enabling treatment or processing of incoming optical fiber 130 as discussed herein with respect to FIG. 18.

Similar to optical fiber connector assembly 100, optical fiber connector assembly 100' may include a bonding agent 127 as discussed above. For the sake of brevity, discussion of bonding agent 127 is omitted in this section, and the relevant disclosure of either the presence or absence of bonding agent 127 (and corresponding laser treatments) for optical fiber connector assembly 100 applies to optical fiber connector assembly 100'.

Rear end 116' of connector base body 104' is configured to receive crimp band 106'. In a manner not shown herein, a fiber optic cable providing optical fiber 130 (FIG. 18) also includes one or more layers of material (e.g., strength layer of aramid yarn) that may be crimped onto rear end 116' of connector base body 104'. A crimp band (or "crimp ring") 106' may be provided for this purpose. As shown, in some embodiments, crimp band 106 is an elongated tube that couples to rear end 116' of connector base body 104' and extends along a length of boot assembly 108' such that crimp band 106' extends beyond the length of boot assembly 108'. Additionally, a strain-relieving boot (e.g., boot assembly 108') may be placed over the crimped region and extend rearwardly to cover a portion of the fiber optic cable. Variations of these aspects will be appreciated by persons familiar with the design of fiber optic cable assemblies. For example, other ways of securing a fiber optic cable to connector base body 104' are also known and may be employed in some embodiments.

Figure 30:
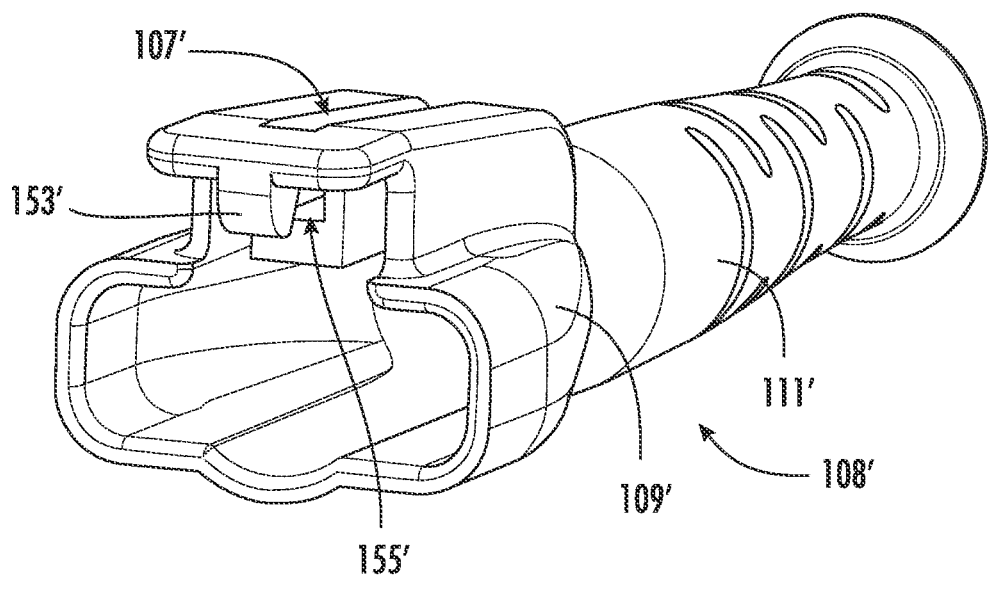
FIG. 30 is a front, perspective view of a boot assembly of connector assembly of FIG. 22.
Figures 31, 32:
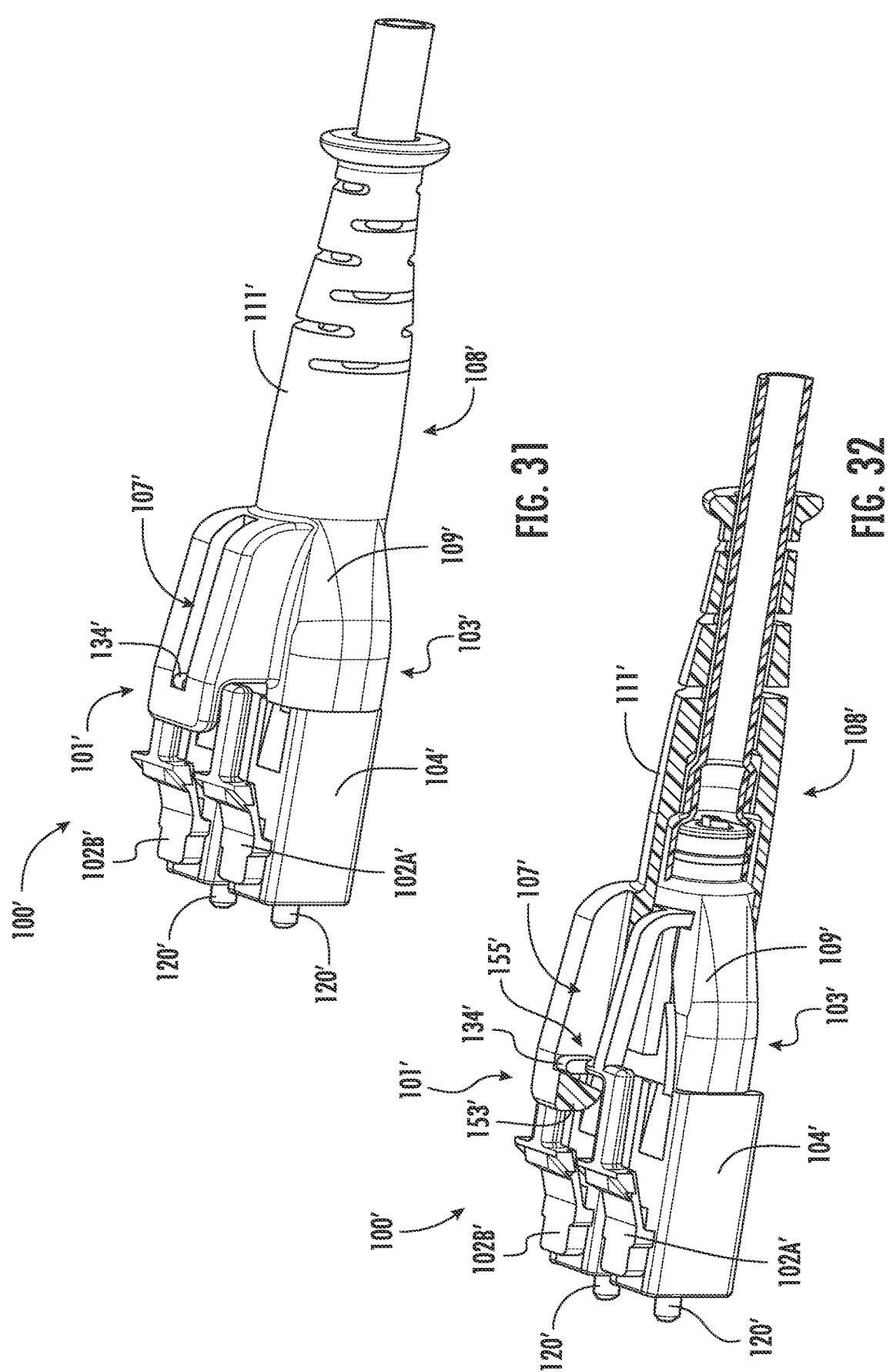
FIG. 31 is a rear, perspective view of the connector assembly of FIG. 22 illustrating the boot assembly of FIG. 30.
FIG. 32 is a partial, rear cross sectional view of the connector assembly of FIG. 22 illustrating the boot assembly of FIG. 30.
Figure 33:
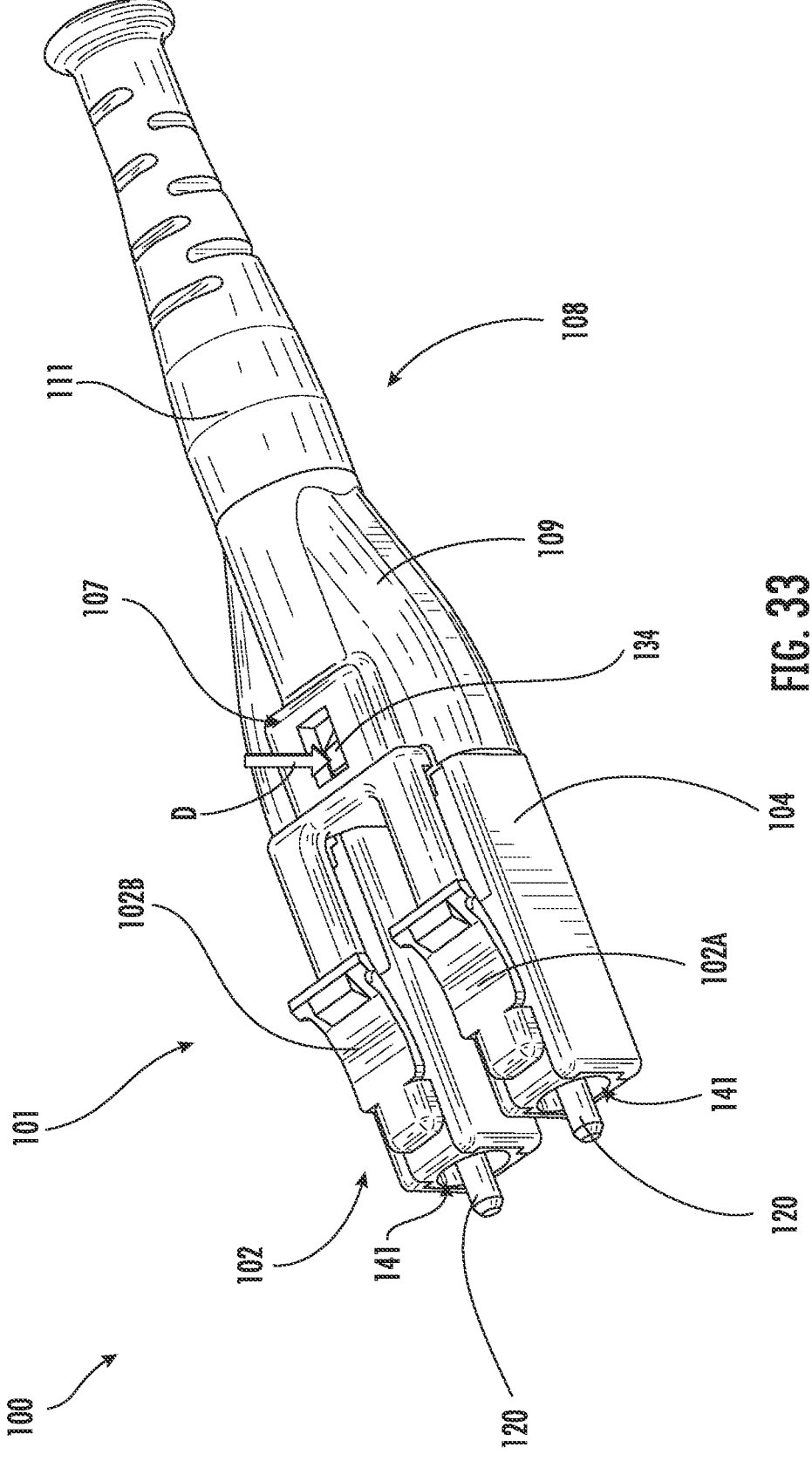
FIGS. 33-44 are perspective views illustrating methods of reversing polarity of the optical fiber assembly in accordance with the present disclosure.

Boot assembly 108' is shown in FIGS. 30-32 and is configured to limit radial movement of optical fiber cable and to actuate latch 102' during assembly or disassembly of optical fiber connector assembly 100'. Boot assembly 108' includes head portion 109' and a tail portion 111' that are coupled together, e.g., through a mechanical connector or by way of being integrally formed together as a unitary structure. In some embodiments, head portion 109' is coupled to tail portion 111' in a snap fit configuration. In an alternate embodiment, boot assembly 108' could be constructed as an elastomer overmolded onto a boot assembly substrate. However, it is contemplated that in other alternate embodiments, alternate coupling configurations may be used. Boot assembly 108' provides a push-pull user experience when assembling and disassembling connector 101' as discussed in greater detail herein. As shown, boot assembly 108' also includes an aperture 132' within a cut out 107' to receive rear protrusion 134' of latch 102' as discussed in greater detail herein. Stated another way, cut out 107' (that includes aperture 132') is sized and configured to receive rear protrusion 134' of latch 102' such that rear protrusion 134' can be coupled to boot assembly 108' as discussed in greater detail herein. In particular, boot assembly 108' includes a downward protrusion 153' that defines a recess 153' where rear protrusion 134' is received and extends into cut out 107' (that includes aperture 132'). In addition, boot assembly 108' provides an advantage of being spatially efficient thereby enabling a high packing density of optical fiber connector assemblies 100' in certain applications (e.g., data centers, etc.).

Optical fiber connector assembly 100' may be assembled using steps similar to those described above for optical connector assembly 100. As such, discussion of the steps with respect to optical fiber connector assembly 100' are omitted for the sake of brevity.

Having described both optical fiber connector assembly 100 and optical fiber connector assembly 100', methods of reversing polarity for both embodiments will now be described.

Method of Reversing Polarity of Optical Fiber Connector Assembly 100

Figure 34:
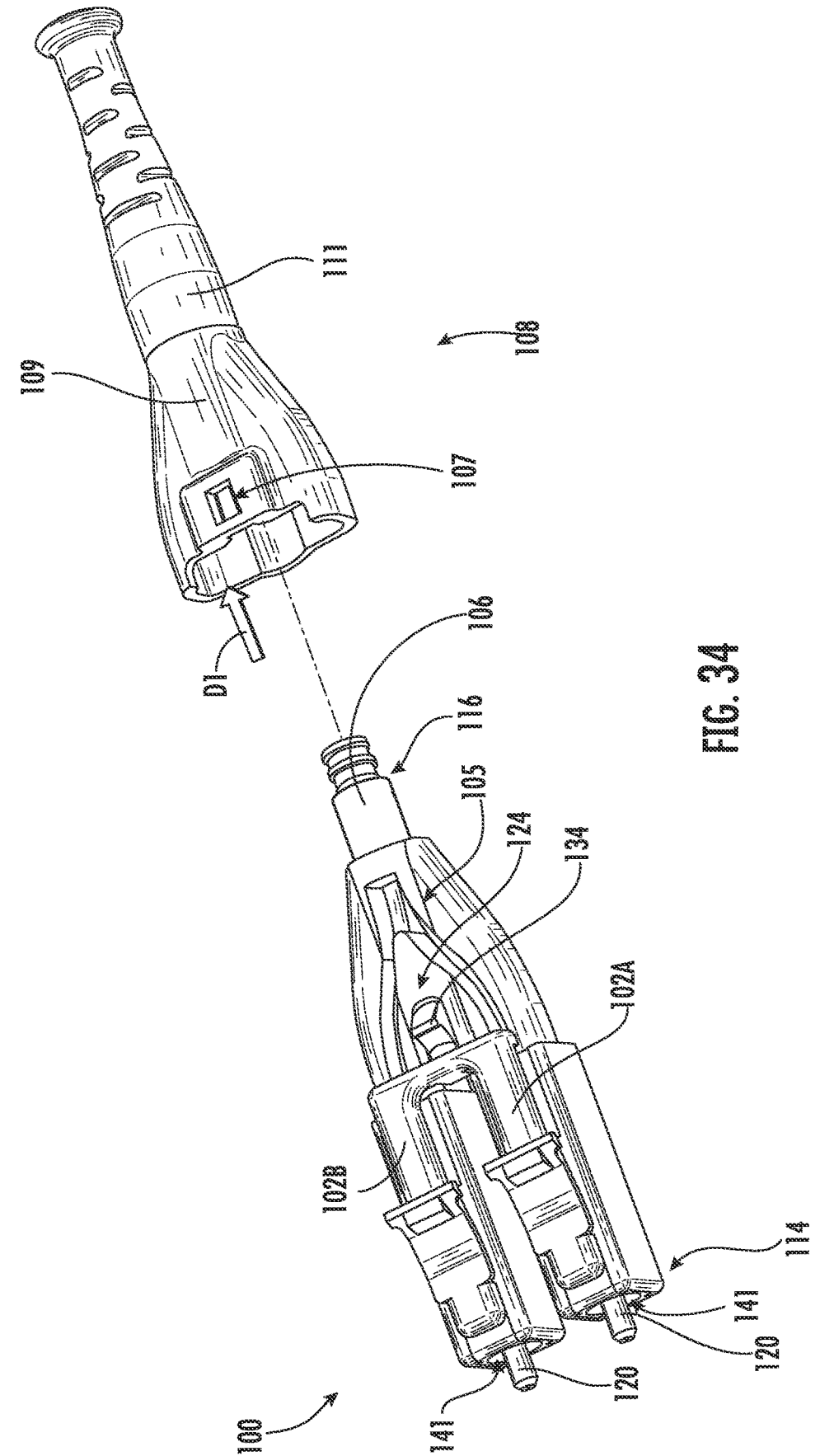
Figure 35:
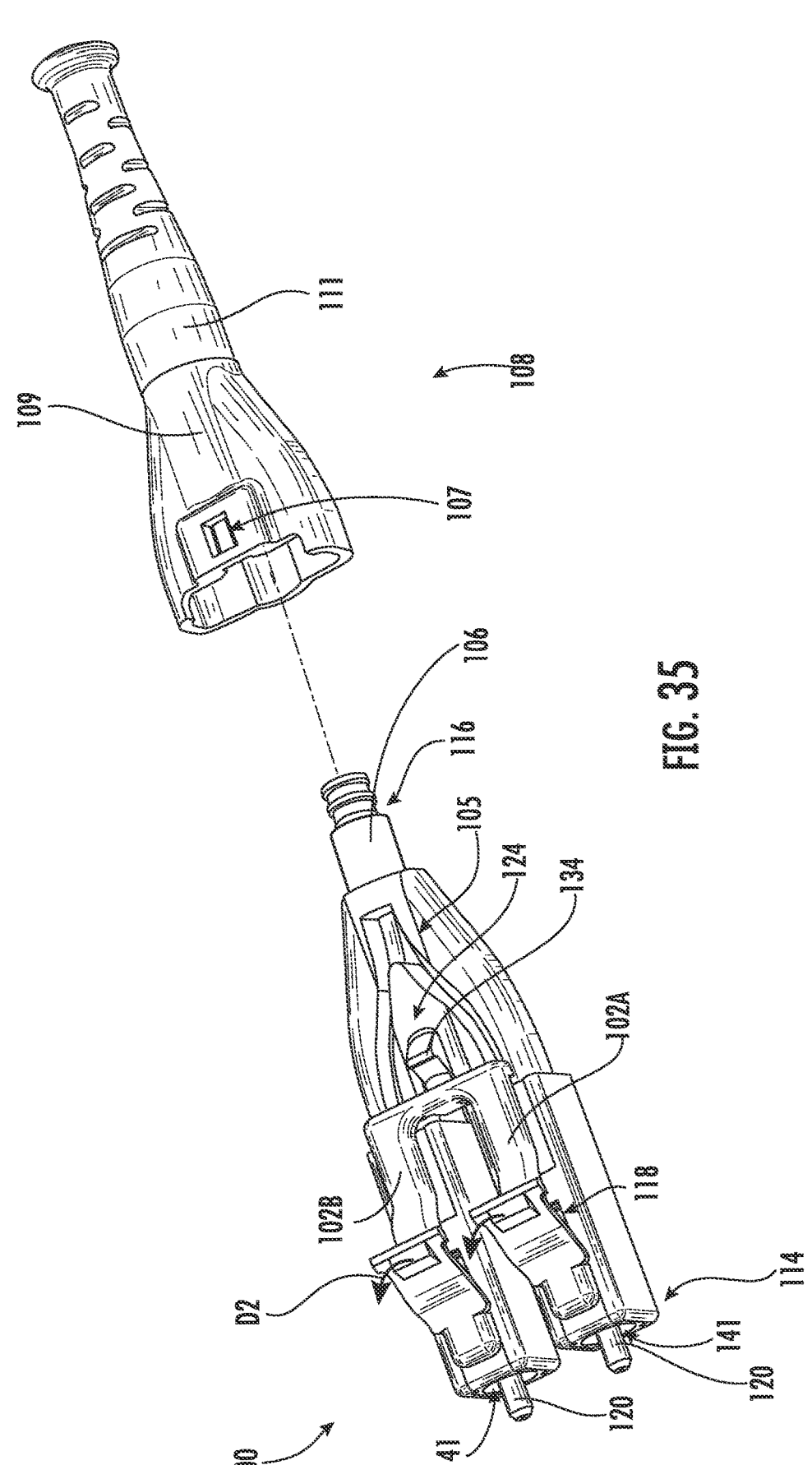
Figure 36:
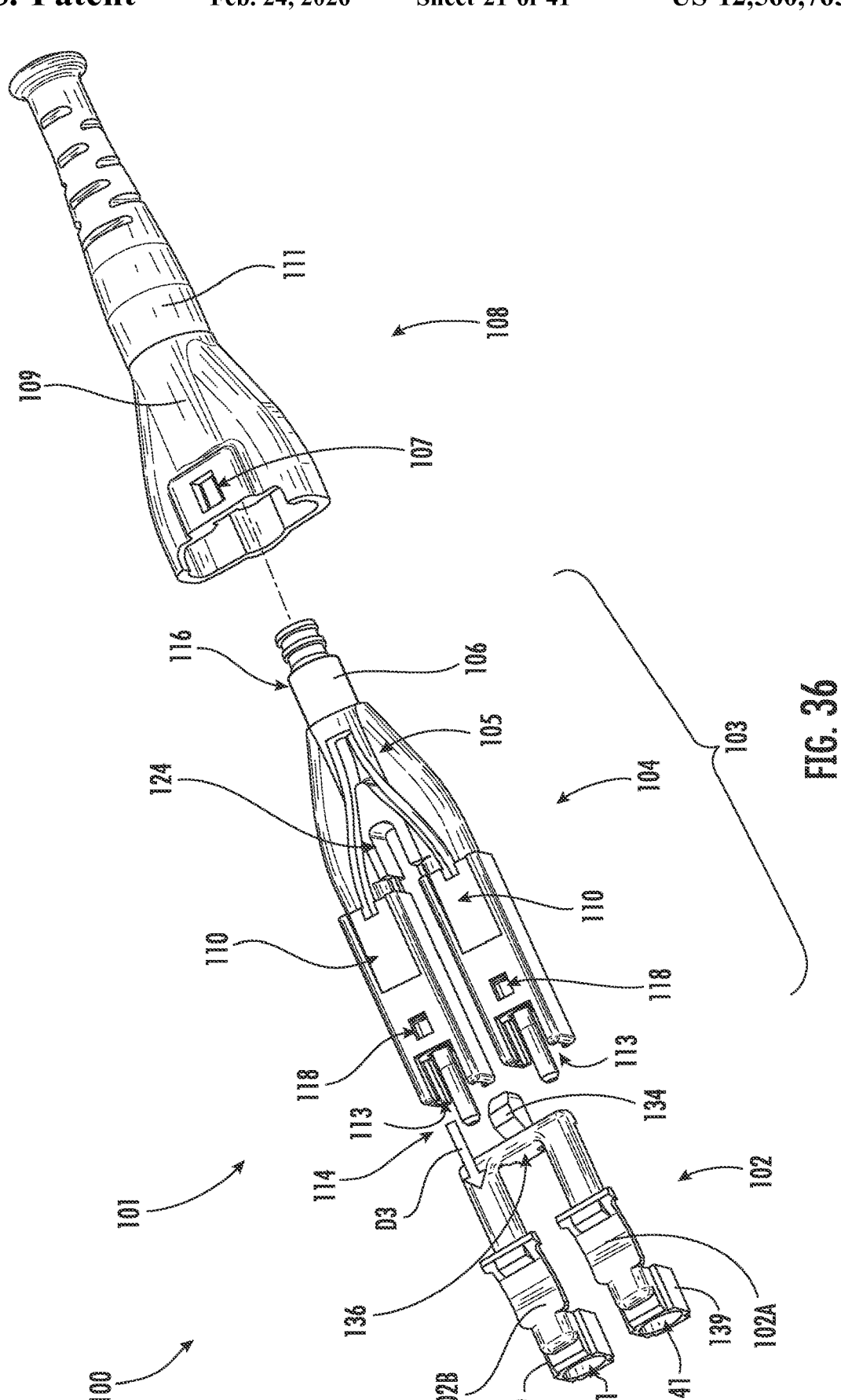

Referring now to FIGS. 33-44, a method of reversing polarity of optical fiber connector assembly 100 is shown. To reverse polarity of optical fiber connector assembly 100, latch 102 is first disengaged from boot assembly 108. In particular, with reference to FIGS. 33 and 34, a downward force in direction D is applied onto rear end 116 and rear protrusion 134 such that rear protrusion disengages with cut out 107 of boot assembly 108. Once disengaged with rear protrusion 134, boot assembly is moved along direction D1 to disengage boot assembly from connector base body 104 as shown in FIG. 34. Then, as shown in FIG. 35, an upward force D2 is applied onto latch arms 102A, 102B to disengage retention protrusions 138 from connector base body 104 (as shown in FIG. 10). Once disengaged, latch 102 is removed from connector base body 104 by moving latch 102 in a direction D3 as shown in FIG. 36 where guide bodies 139 are removed from recesses 113.

Figure 37:
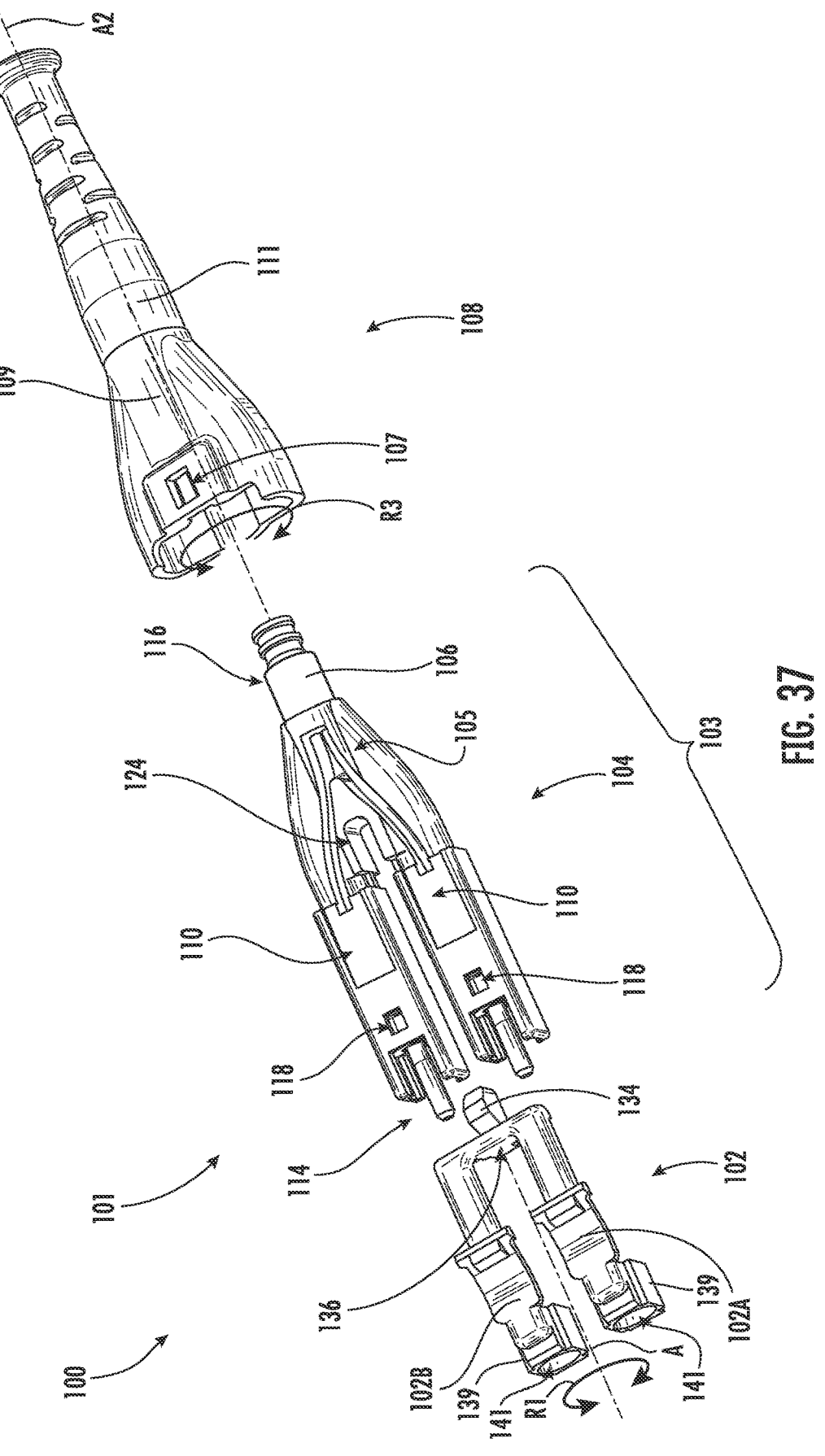
Figure 38:
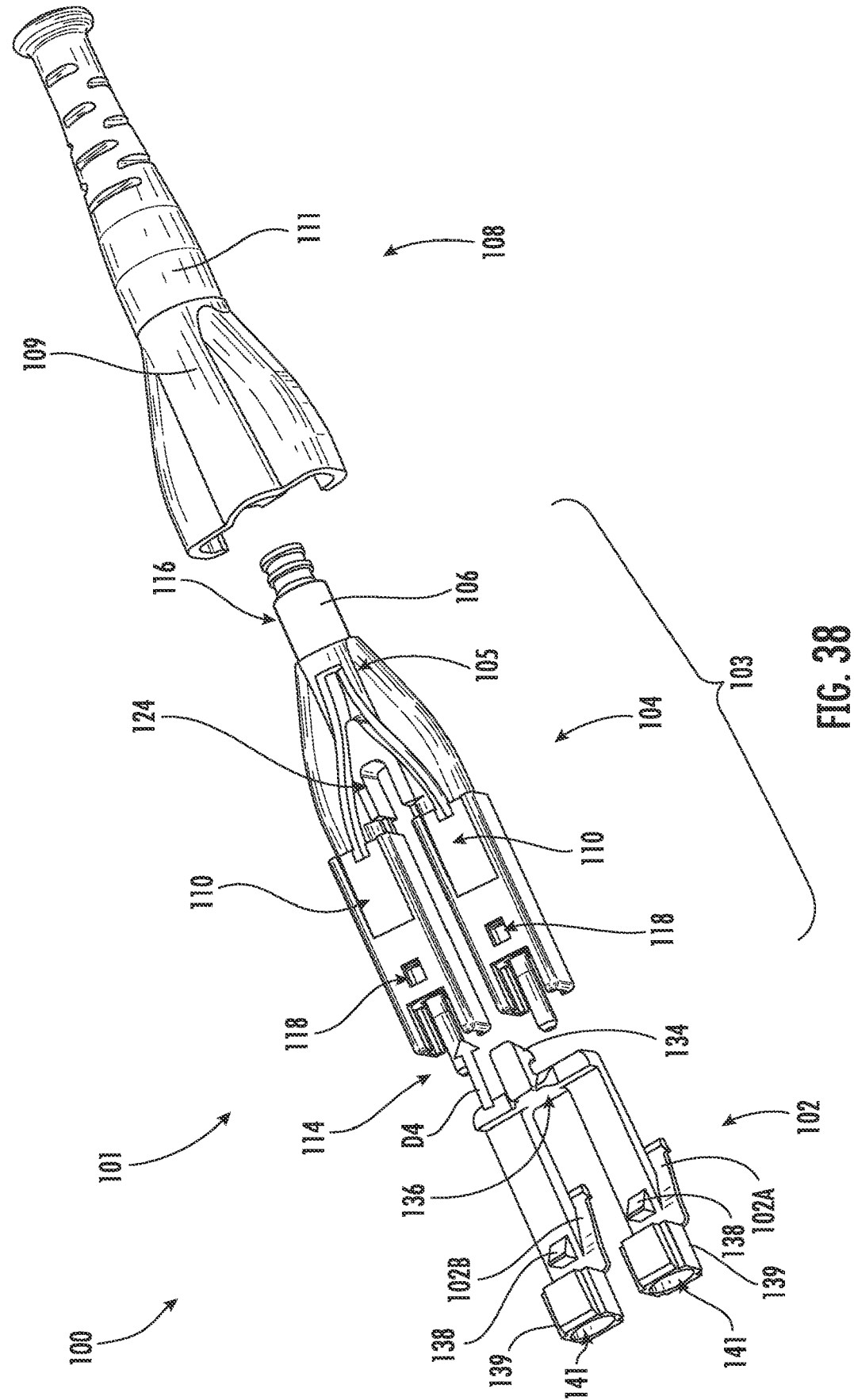
Figure 39:
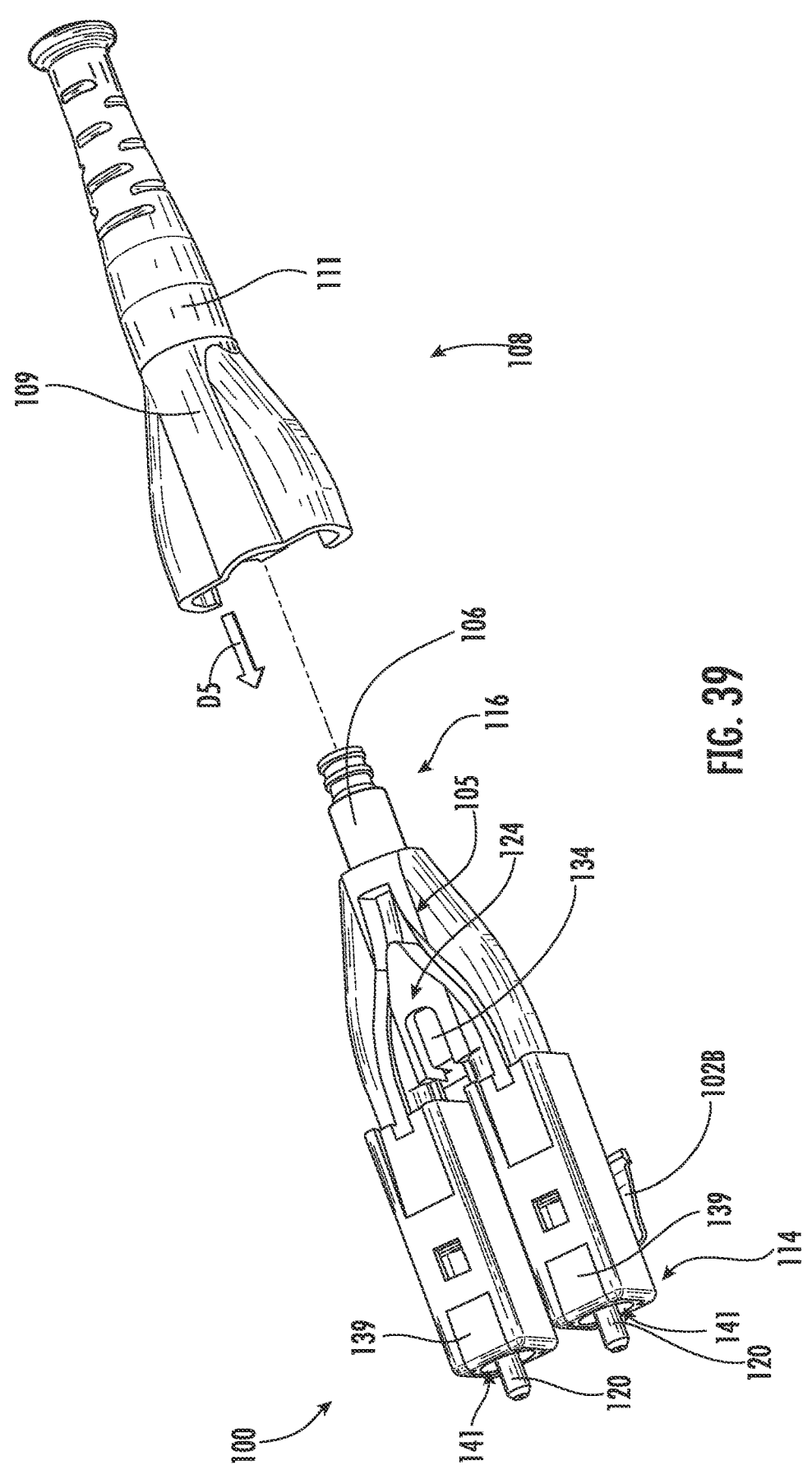
Figure 40:
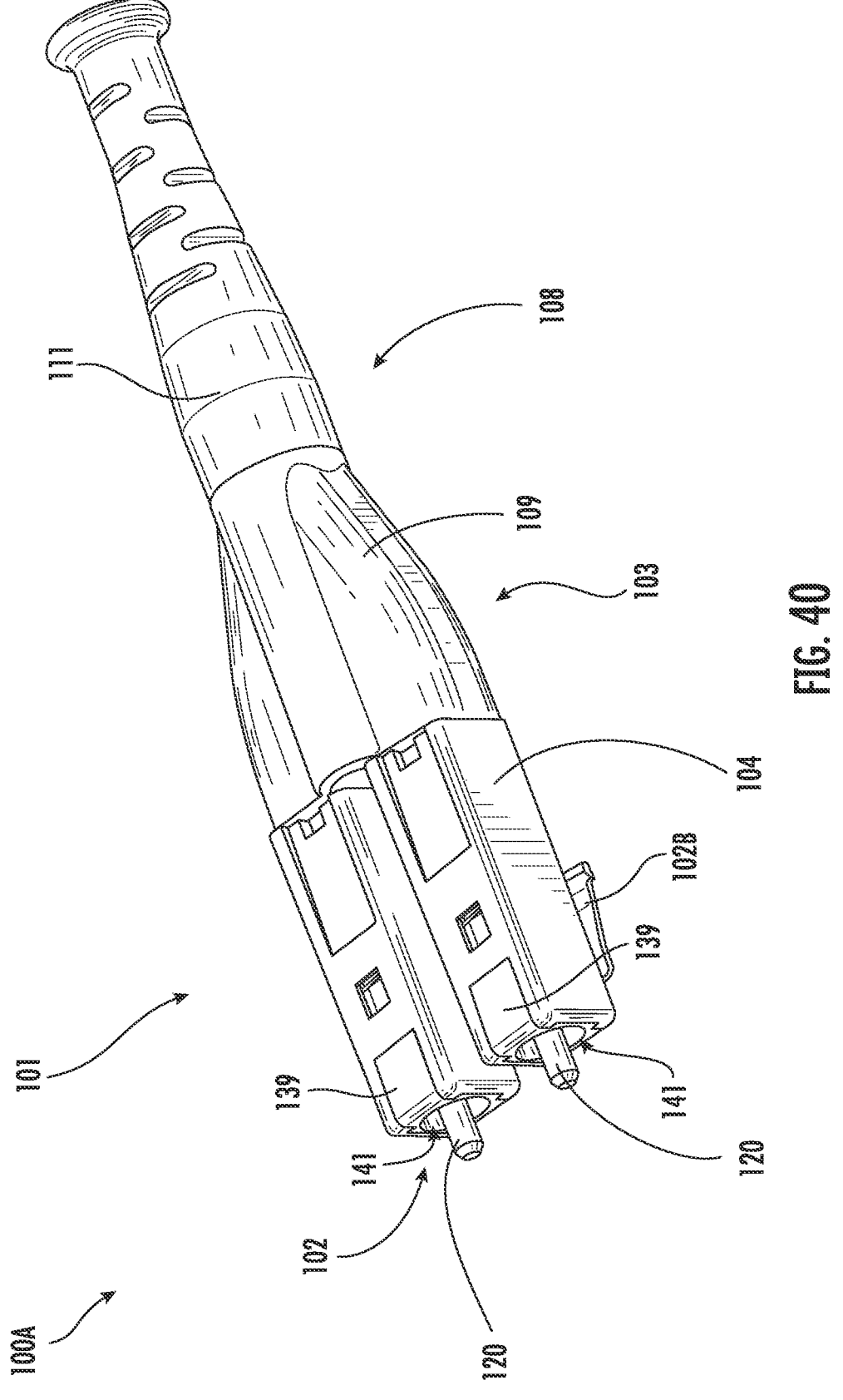

To reverse the polarity of optical fiber connector 101 and optical fiber connector assembly 101, latch 102 is rotated about 180 degrees relative to a central axis A of latch 102 in either direction R1, and boot assembly 108 is rotated about 180 degrees relative to a central axis A2 in either direction R3 as shown in FIG. 37. Then, as shown in FIG. 38, flipped latch 102 is coupled onto connector subassembly 103 when flipped latch 102 is moved along direction D4 such that flipped latch 102 is re-applied onto connector base body 104 of connector subassembly 103 such that retention protrusions 138 engage with connector base body 104 of connector subassembly 103 and guide bodies 139 are received into recesses 113 such that guide bodies 139 mesh and/or contact with front end 114 of connector base body 104. Boot assembly 108 is then coupled to flipped latch 102 and connector subassembly 103 by moving boot assembly 108 along direction D5 as shown in FIG. 39 thereby resulting in an optical fiber connector assembly 100A with a reversed polarity as shown in FIG. 40. Stated another way, with respect to boot assembly 108, boot assembly 108 is applied onto connector base body 104 of connector subassembly 103 from rear end 116 to engage with rear protrusion 134 of flipped latch arm 102 thereby resulting in an optical fiber connector assembly 100A with a reversed polarity as shown in FIG. 40.

Figure 41:
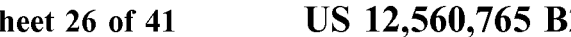
Figure 42:
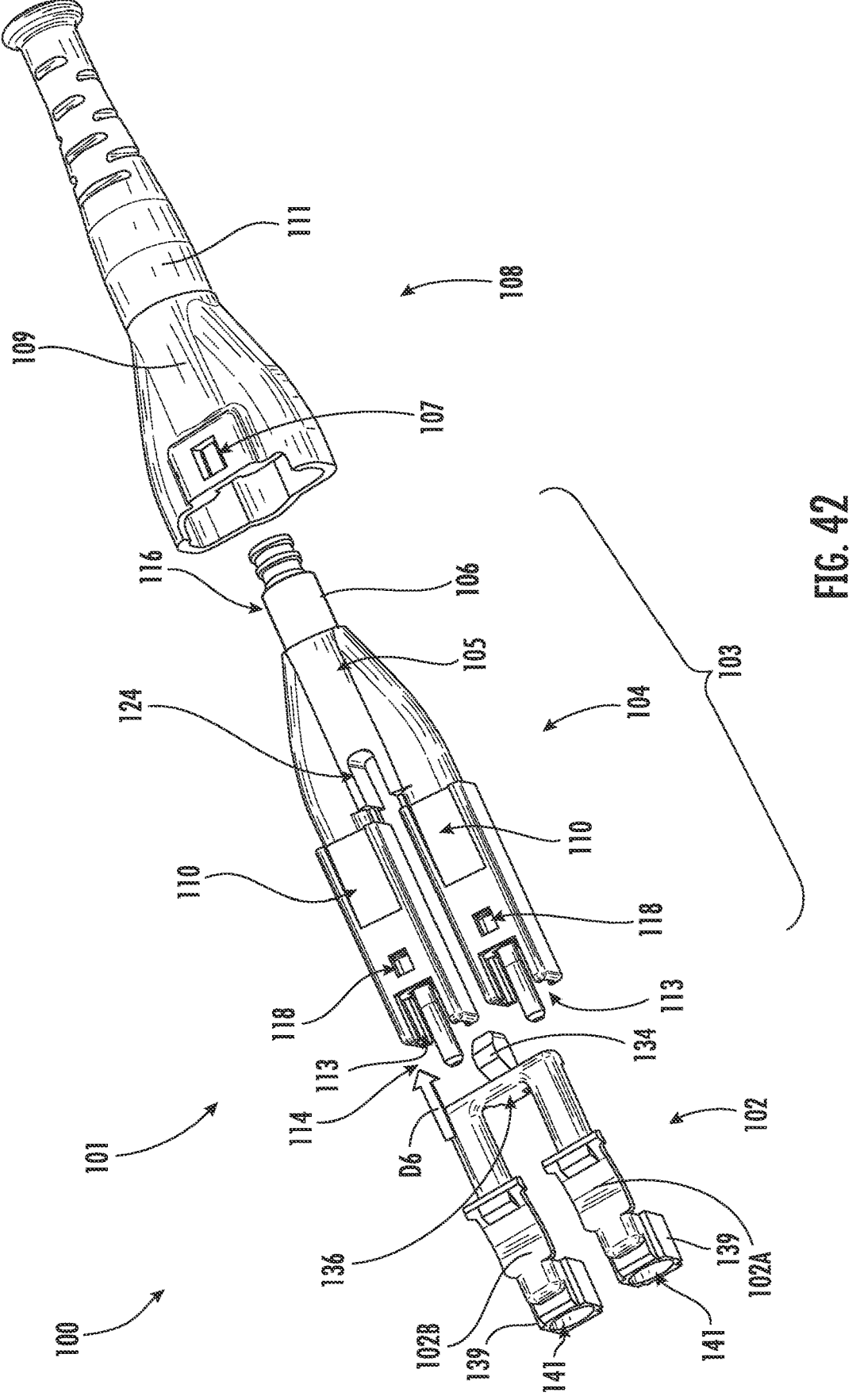
Figure 43:
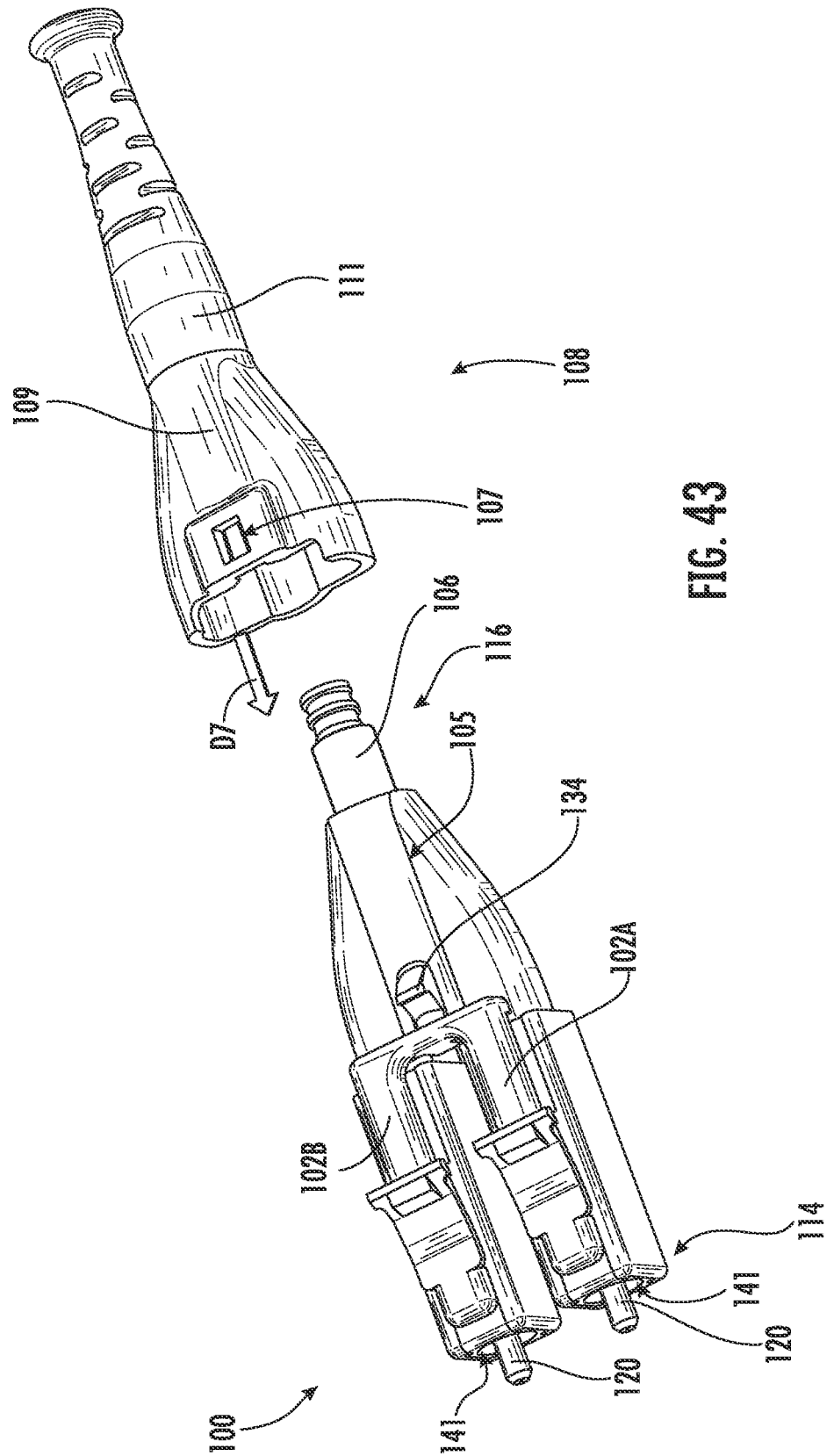
Figure 44:
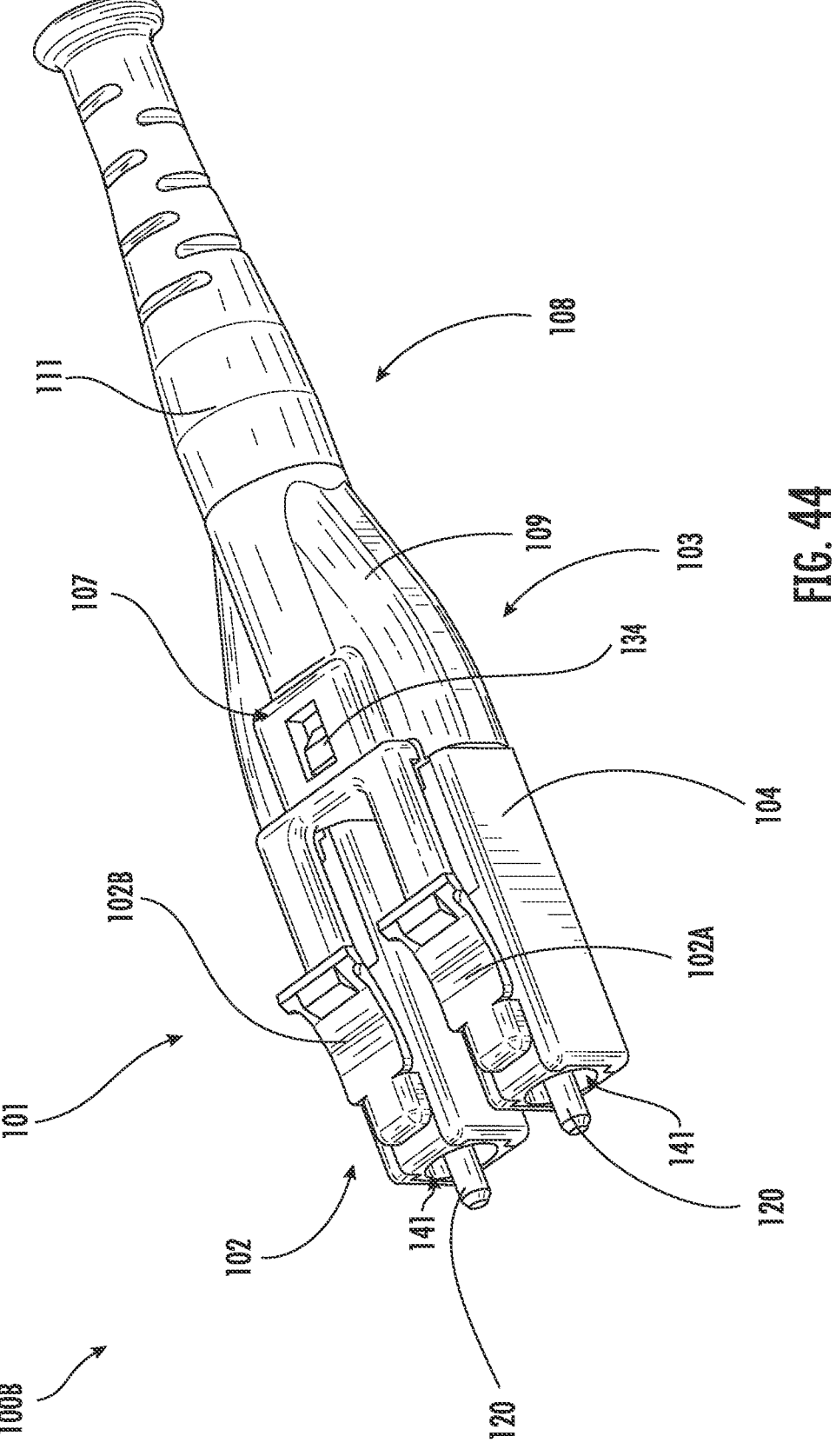
Figure 45:
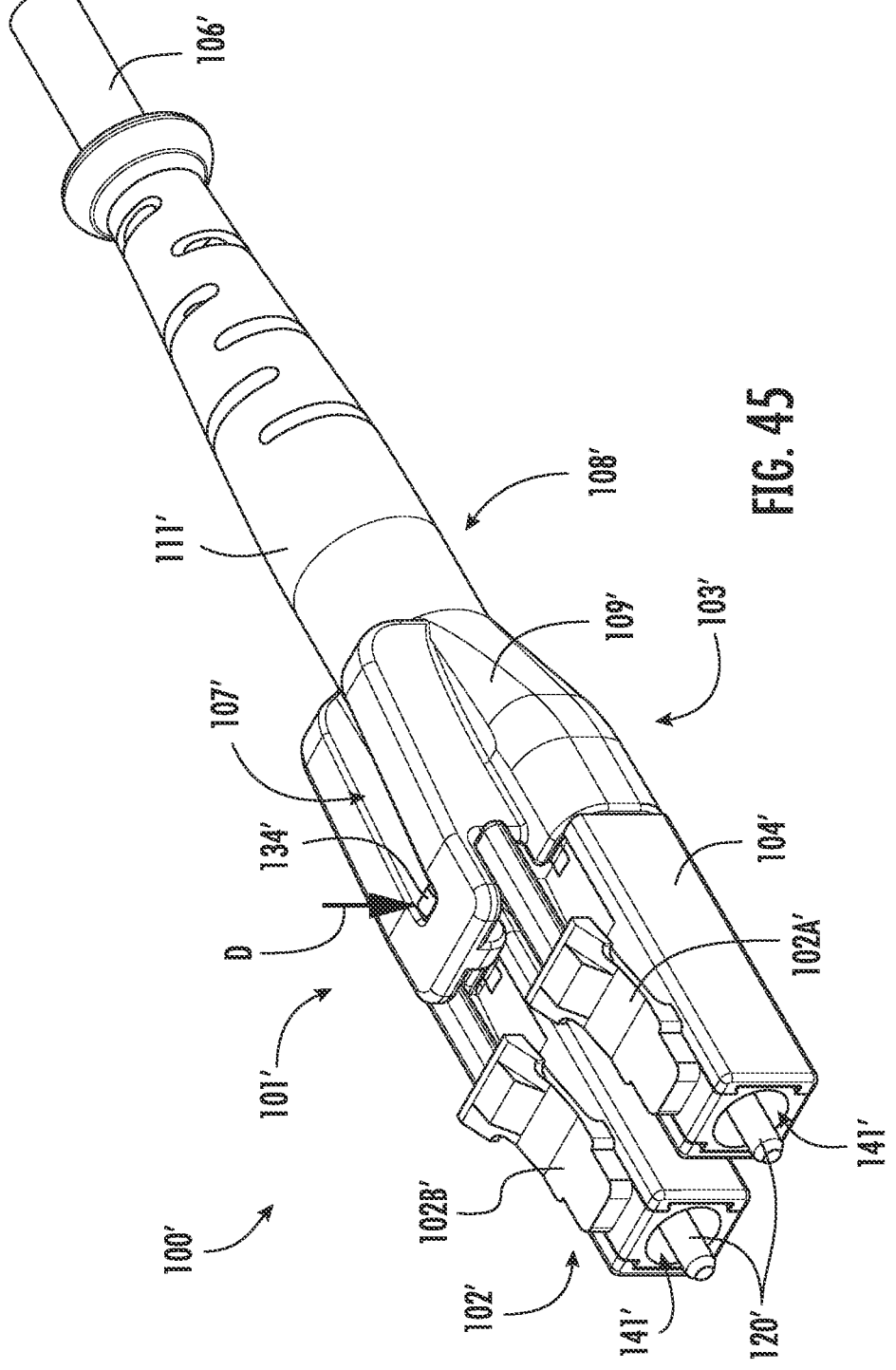
FIGS. 45-56 are perspective views illustrating methods of reversing polarity of the alternate embodiment of the optical fiber assembly of FIG. 22 in accordance with the present disclosure.

In an alternate embodiment, after optical fiber connector assembly 100 is disassembled as shown in FIG. 36, connector subassembly 103 is rotated about 180 degrees relative to a central axis A1 by moving connector subassembly 103 in either direction R2 as shown in FIG. 41. Then, as shown in FIG. 42, latch 102 is coupled onto flipped connector subassembly 103 when latch 102 is moved along direction D6 such that latch 102 is re-applied onto flipped connector base body 104 of flipped connector subassembly 103 such that retention protrusions 138 engage with flipped connector base body 104 of flipped connector subassembly 103 and guide bodies 139 are received into recesses 113 such that guide bodies 139 mesh and/or contact with front end 114 of connector base body 104. Flipped boot assembly 108 are then coupled to latch 102 and flipped connector subassembly 103 by moving flipped boot assembly 108 along direction D7 as shown in FIG. 43 thereby resulting in an optical fiber connector assembly 100B with a reversed polarity as shown in FIG. 44. Stated another way, with respect to flipped boot assembly 108, flipped boot assembly 108 is applied onto flipped connector base body 104 of flipped connector subassembly 103 from rear end 116 to engage with rear protrusion 134 of latch arm 102 thereby resulting in an optical fiber connector assembly 100A with a reversed polarity as shown in FIG. 44.

Advantageously, the polarity reversal process outlined herein enables the polarity of optical fiber connector 101 to be reversed without twisting optical fibers 130.

Method of Reversing Polarity of Optical Fiber Connector Assembly 100′

Figure 46:
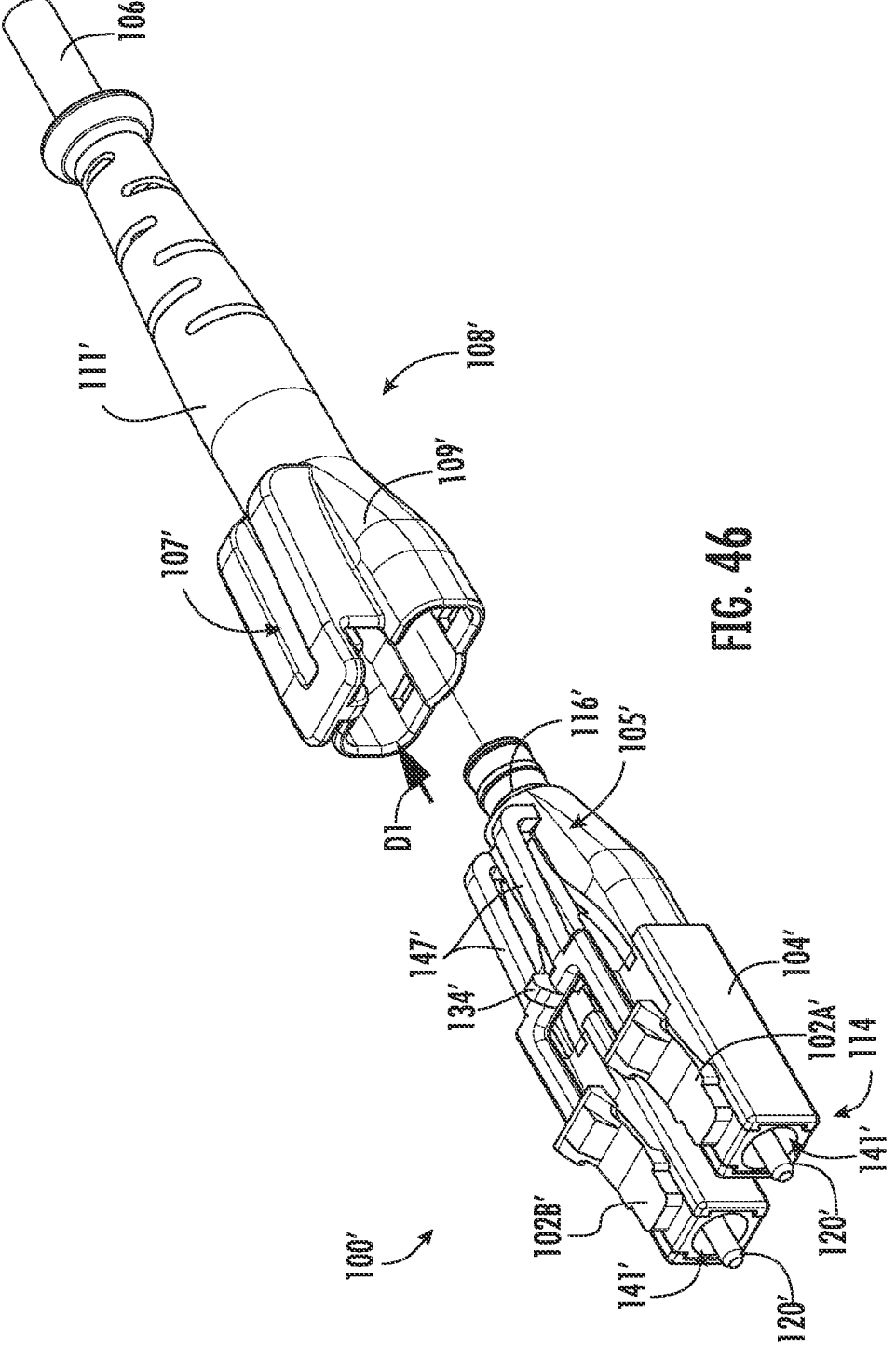
Figure 47:
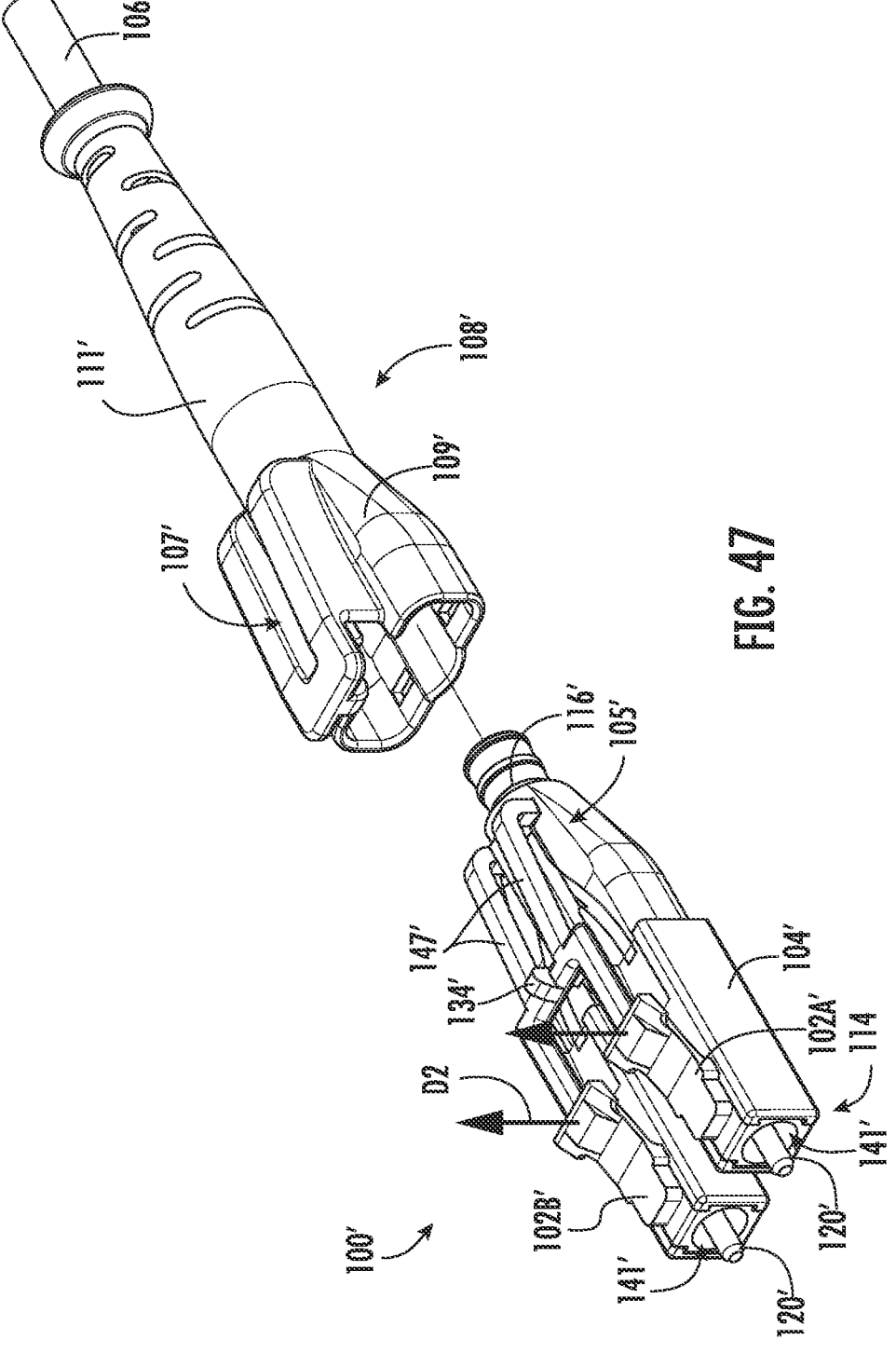
Figure 48:

Referring now to FIGS. 45-56, a method of reversing polarity of optical fiber connector assembly 100′ is shown. To reverse polarity of optical fiber connector assembly 100′, latch 102′ is first disengaged from boot assembly 108′. In particular, with reference to FIG. 45, a downward force in direction D is applied onto rear end 116′ and rear protrusion 134′ such that rear protrusion disengages with cut out 107′ of boot assembly 108′. Once disengaged with rear protrusion 134′, boot assembly s moved along direction D1 to disengage boot assembly from connector base body 104′ as shown in FIG. 46. Then, as shown in FIG. 47, an upward force D2 is applied onto latch arms 102A′, 102B′ to disengage centering member 143′ from centering slot 145′ of connector base body 104′. Once disengaged, latch 102′ is removed from connector base body 104′ by moving latch 102′ in a direction D3 as shown in FIG. 48 where guide bodies 139′ are removed from recesses 113′.

Figure 49:
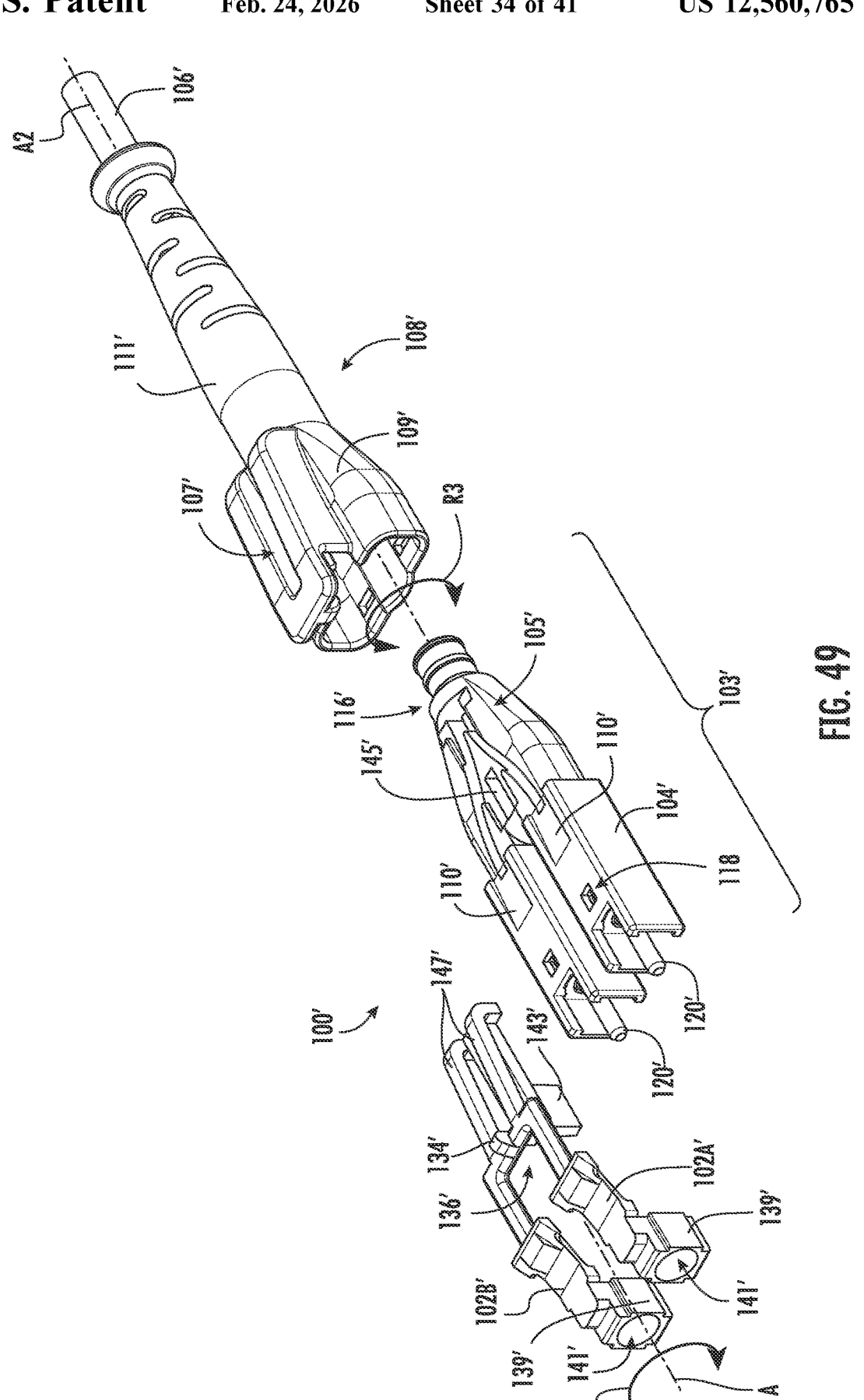
Figure 50:
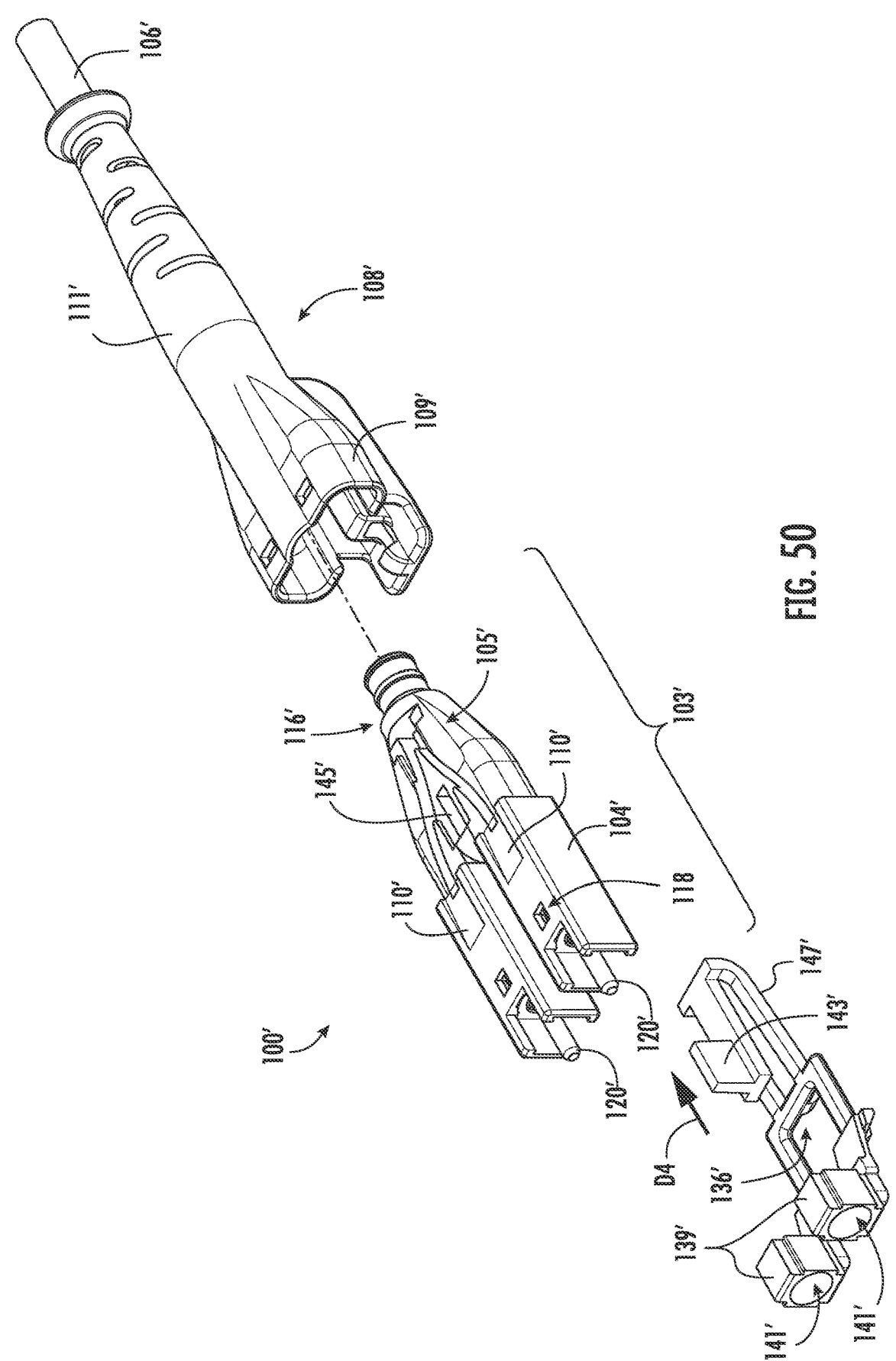

To reverse the polarity of optical fiber connector 101′ and optical fiber connector assembly 100′, latch 102′ is rotated about 180 degrees relative to a central axis A of latch 102′ in either direction R1, and boot assembly 108′ is rotated about 180 degrees relative to a central axis A2 in either direction R3 as shown in FIG. 49. Then, as shown in FIG. 50, flipped latch 102′ is coupled onto connector subassembly 103′ when flipped latch 102′ is moved along direction D4 such that flipped latch 102′ is re-applied onto connector base body 104′ of connector subassembly 103′ such that retention protrusions 138′ engage with connector base body 104′ of connector subassembly 103′ and guide bodies 139′ are received into recesses 113′ such that guide bodies 139′ mesh and/or contact with front end 114′ of connector base body 104′. Boot assembly 108′ is then coupled to flipped latch

Figure 51:
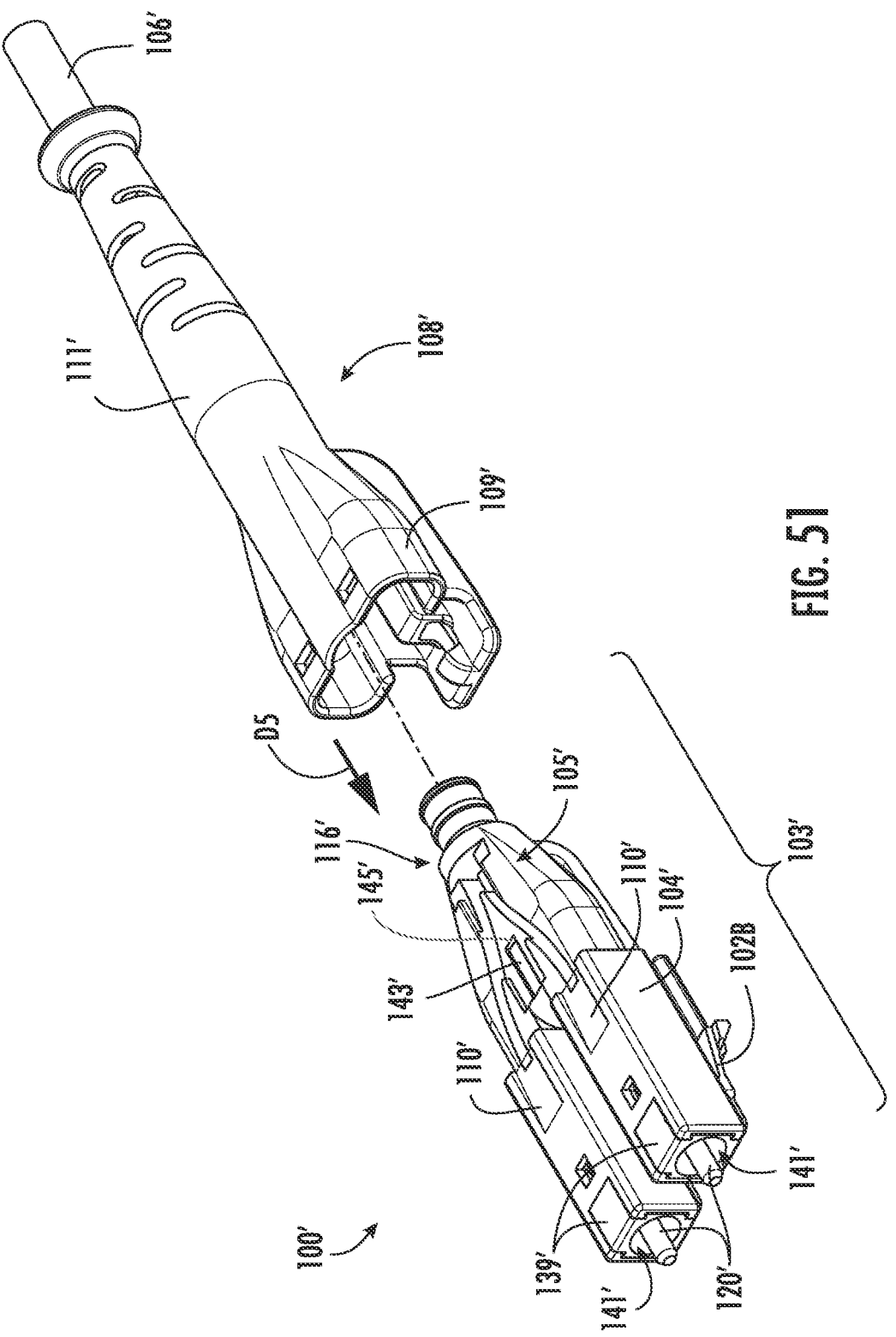
Figure 52:
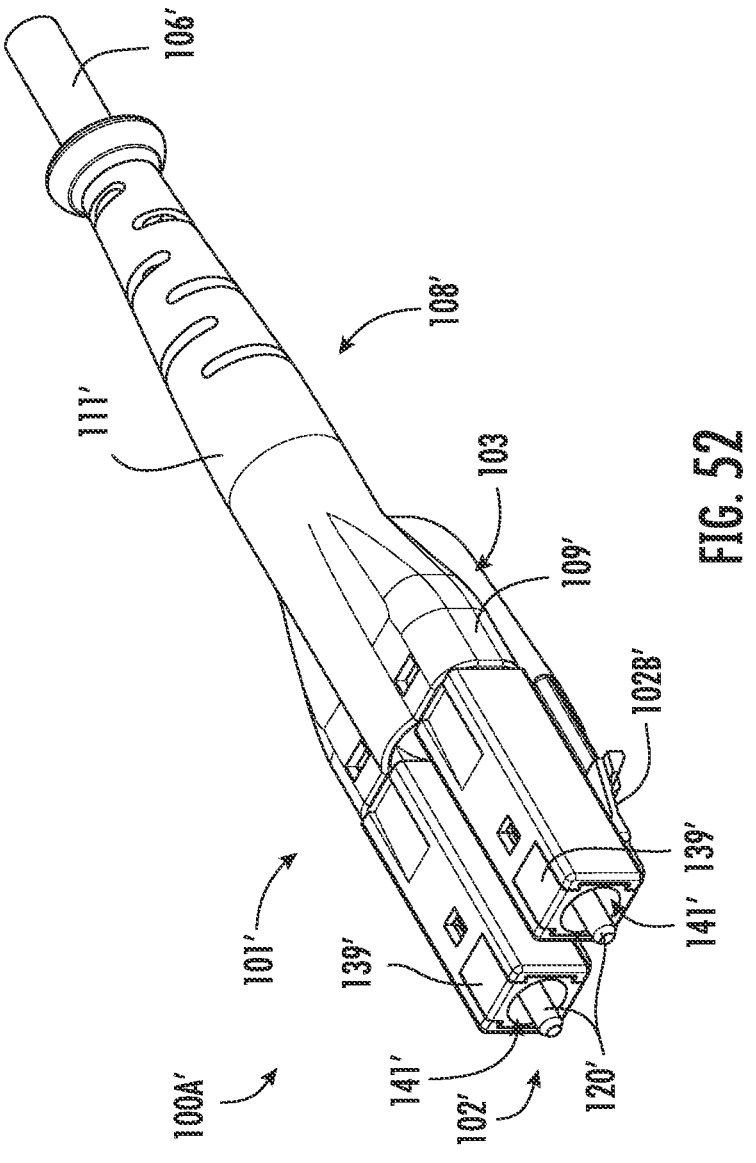

102′ and connector subassembly 103′ by moving boot assembly 108′ along direction D5 as shown in FIG. 51 thereby resulting in an optical fiber connector assembly 100A′ with a reversed polarity as shown in FIG. 52. Stated another way, with respect to boot assembly 108′, boot assembly 108′ is applied onto connector base body 104′ of connector subassembly 103′ from rear end 116′ to engage with rear protrusion 134′ of flipped latch arm 102′ thereby resulting in an optical fiber connector assembly 100A′ with a reversed polarity as shown in FIG. 52.

Figure 53:
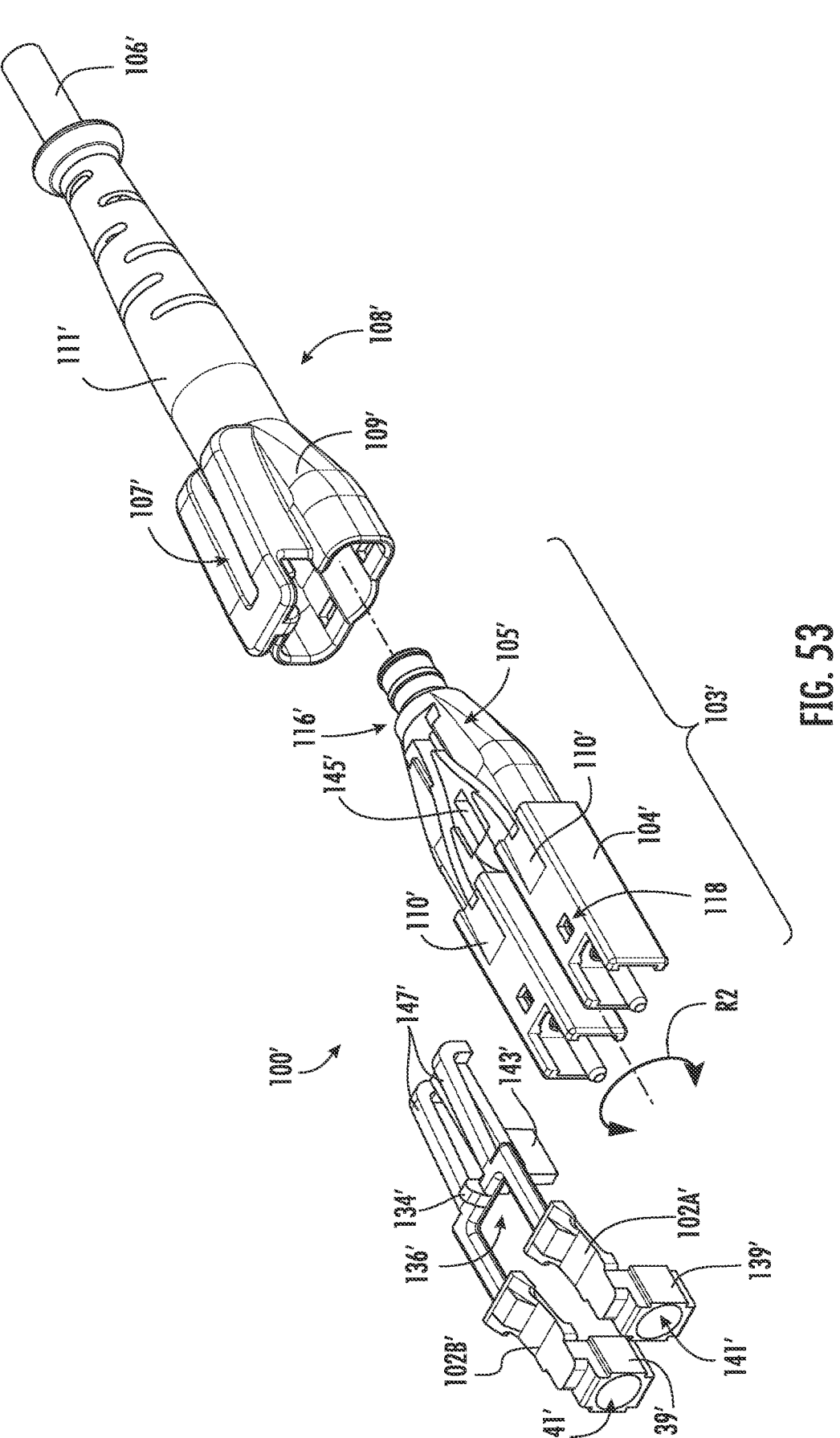
Figure 54:
Figure 55:
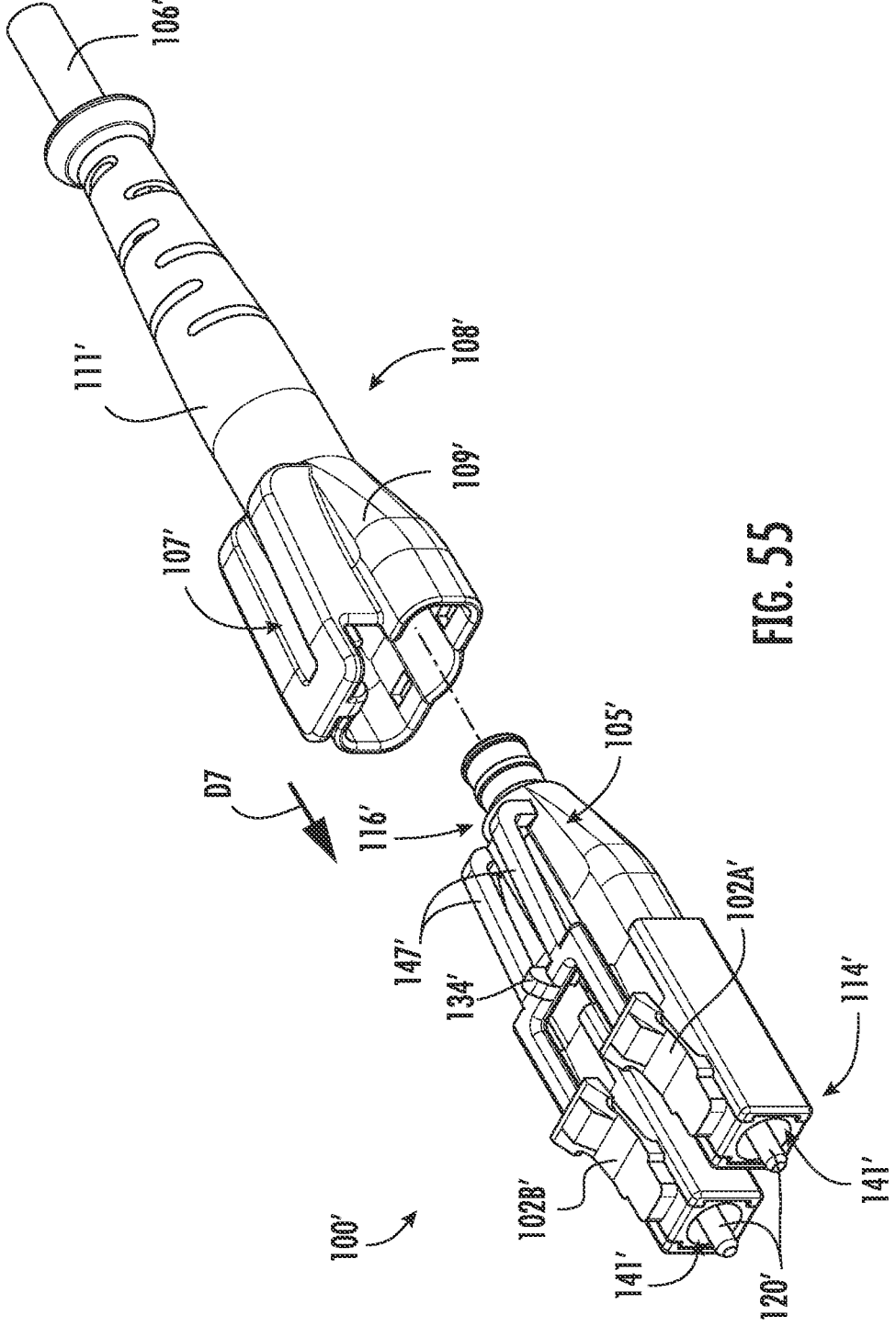
Figure 56:
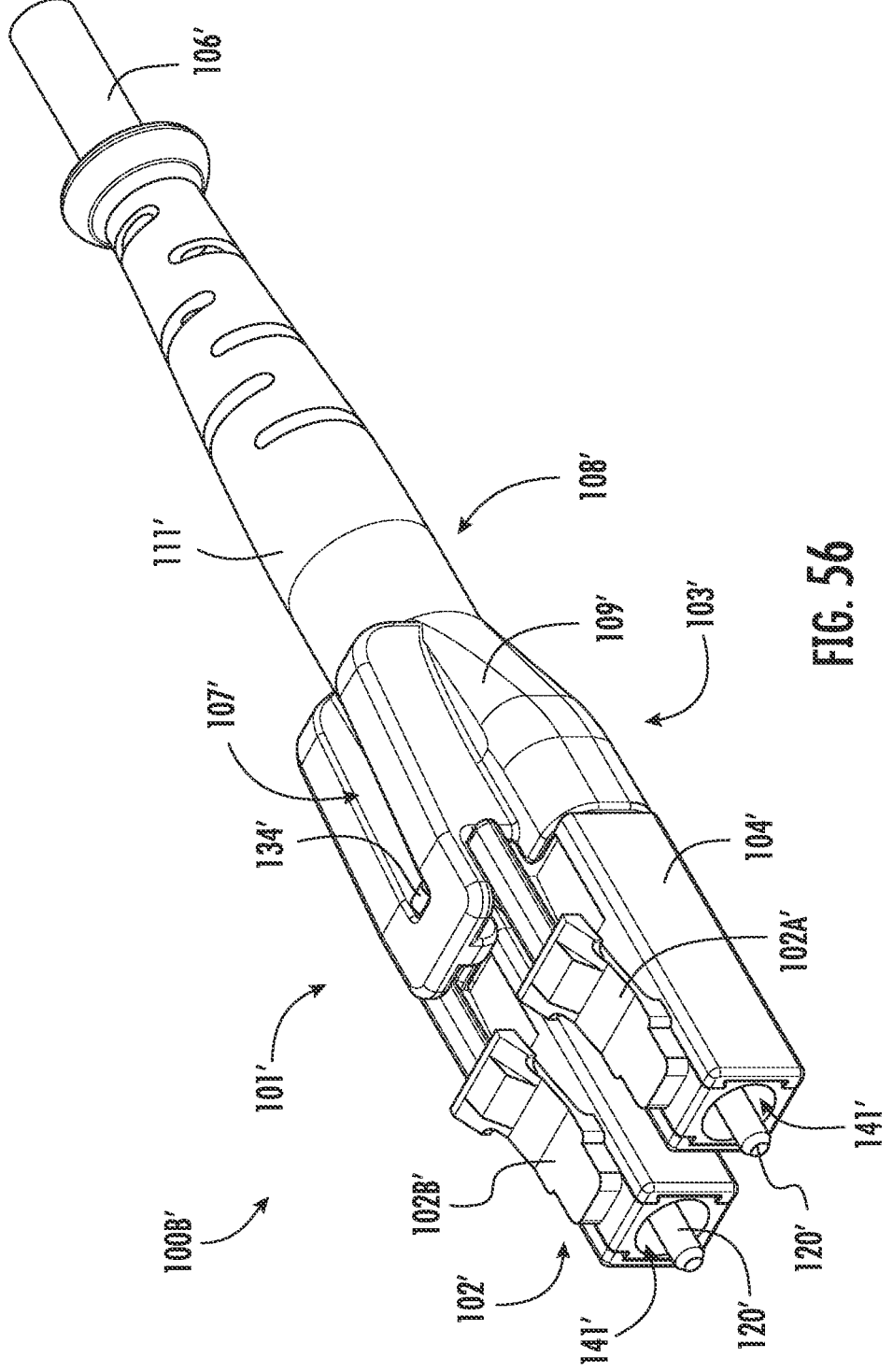

In an alternate embodiment, after optical fiber connector assembly 100′ is disassembled as shown in FIG. 48, connector subassembly 103′ is rotated about 180 degrees relative to a central axis A1 by moving connector subassembly 103′ in either direction R2 as shown in FIG. 53. Then, as shown in FIG. 54, latch 102′ is coupled onto flipped connector subassembly 103′ when latch 102′ is moved along direction D6 such that latch 102′ is re-applied onto flipped connector base body 104′ of flipped connector subassembly 103′ such that retention protrusions 138′ engage with flipped connector base body 104′ of flipped connector subassembly 103′ and guide bodies 139′ are received into recesses 113′ such that guide bodies 139′ mesh and/or contact with front end 114′ of connector base body 104′. Flipped boot assembly 108′ are then coupled to latch 102′ and flipped connector subassembly 103′ by moving flipped boot assembly 108′ along direction D7 as shown in FIG. 55 thereby resulting in an optical fiber connector assembly 100B′ with a reversed polarity as shown in FIG. 56, Stated another way, with respect to flipped boot assembly 108′, flipped boot assembly 108′ is applied onto flipped connector base body 104′ of flipped connector subassembly 103′ from rear end 116′ to engage with rear protrusion 134′ of latch arm 102′ thereby resulting in an optical fiber connector assembly 100A′ with a reversed polarity as shown in FIG. 56.

Advantageously, the polarity reversal process outlined herein enables the polarity of optical fiber connector 101′ to be reversed without twisting optical fibers 130′.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A method of reversing a polarity of a connector assembly, the connector assembly including a connector subassembly and a latch having a plurality of latch arms, the latch coupled to the connector subassembly; the method comprising:

removing a boot assembly from the connector subassembly;

removing the latch from the connector subassembly by applying an upward force onto the latch;

inverting one of the latch and the connector subassembly from a first orientation to a second orientation about a central axis of the latch or a central axis of the connector subassembly;

applying the latch onto the connector subassembly at a front end of the connector subassembly.

2. The method of claim 1, further comprising:

disengaging the latch from the boot assembly coupled to the connector subassembly by applying a downward force onto a rear protrusion of the latch.

3. The method of claim 1, wherein the latch has the first orientation before being removed from the connector pre-assembly, and wherein the inverting step includes rotating the latch 180 degrees about the central axis of the latch to the second orientation.

4. The method of claim 3, wherein the inverting step further includes rotating the boot assembly 180 degrees about a central axis of the boot assembly.

5. The method of claim 1, wherein the latch further includes at least one flex arm extending from a rear portion of the latch and a centering member extending from the rear portion of the latch, wherein the latch is coupled to the connector subassembly when the centering member is inserted into a centering slot of the connector subassembly.

6. The method of claim 5, wherein removing the latch includes applying an upward force onto the latch such that the centering member is removed from the centering slot and then applying a lateral force such that the latch is removed from the connector subassembly.

7. The method of claim 1, wherein removing the boot assembly includes sliding the boot assembly such that the boot assembly disengages from the connector subassembly.

8. The method of claim 1, further including coupling the boot assembly onto the connector subassembly and the latch in the second orientation.

9. The method of claim 1, wherein the connector pre-assembly has the first orientation before removing the latch from the connector pre-assembly, and wherein the inverting step includes rotating the connector subassembly 180 degrees about a central axis of the connector subassembly to the second orientation.

10. The method of claim 1, wherein the connector sub-assembly includes at least one ferrule assembly comprising a ferrule coupled to a ferrule holder, wherein the ferrule holder is within a clip carrier that has a protrusion along a bottom surface of the clip carrier that engages with the connector subassembly thereby coupling the ferrule and the ferrule holder to the connector subassembly.

11. The method of claim 1, wherein the latch includes a pair of guide bodies on a front end of the latch that are received onto the front end of the connector subassembly.

12. A method of assembling an optical fiber connector assembly and reversing the polarity of the optical fiber connector assembly, the method comprising:

inserting a ferrule into a connector subassembly;
cleaving an optical fiber;
inserting the optical fiber into a rear end of the connector subassembly and into an internal bore of the ferrule;
securing the optical fiber to ferrule with an adhesive;
coupling a boot assembly to a rear end of the connector subassembly; and
coupling a latch onto a front end of the connector subassembly, wherein a rear end of the latch is coupled to the boot assembly;
the rear end includes at least one flex arm and a centering member extending from the rear portion of the latch, wherein the centering member engages with a centering slot of the connector subassembly to couple the latch to the connector subassembly.

13. The method of claim 12, wherein cleaving the optical fiber occurs after the optical fiber is inserted into the rear end of the connector subassembly and before the optical fiber is inserted into the internal bore of the ferrule.

14. The method of claim 12, further including:
disengaging the latch from the boot assembly;
removing the boot assembly;
removing the latch from the connector assembly by applying a force onto the latch such that the centering member of the latch is removed from a centering slot of the connector subassembly;
inverting the latch or the connector subassembly from a first orientation to a second orientation about a central axis of the respective latch or the respective connector subassembly; and
applying the latch onto the connector subassembly.

15. The method of claim 14, wherein the inverting step includes rotating the latch 180 degrees about the central axis of the latch to form an inverted latch; and
wherein the applying the latch step includes applying the inverted latch onto the connector subassembly.

16. The method of claim 15, wherein the inverting step further includes rotating the boot assembly 180 degrees about a central axis of the boot assembly.

17. The method of claim 14, wherein the inverting step includes rotating the connector subassembly 180 degrees about the central axis of the connector subassembly to form an inverted connector subassembly; and
wherein the applying the latch step includes applying the latch onto the inverted connector subassembly.

18. A method of reversing a polarity of a connector assembly, the connector assembly including a connector subassembly and a latch having a plurality of latch arms, the latch coupled to the connector subassembly; the method comprising:

removing a boot assembly from the connector subassembly;
removing the latch from the connector subassembly by applying an upward force onto the latch;
inverting one of the latch and the connector subassembly from a first orientation to a second orientation about a central axis of the latch or a central axis of the connector subassembly;
applying the latch onto the connector subassembly at a front end of the connector subassembly;
wherein the latch further includes at least one flex arm extending from a rear portion of the latch and a centering member extending from the rear portion of the latch, wherein the latch is coupled to the connector subassembly when the centering member is inserted into a centering slot of the connector subassembly.

19. The method of claim 18, further comprising:
disengaging the latch from the boot assembly coupled to the connector subassembly by applying a downward force onto a rear protrusion of the latch.

20. The method of claim 18, further including coupling the boot assembly onto the connector subassembly and the latch in the second orientation.

* * * * *